(12) United States Patent
Basra et al.

(10) Patent No.: US 12,106,671 B1
(45) Date of Patent: Oct. 1, 2024

(54) DEVICE AND METHOD FOR ASSET PLATFORM DETERMINATION FOR AN ASSET WITH A MULTI-INTERFACE PORT

(71) Applicant: Geotab Inc., Oakville (CA)

(72) Inventors: Kanwaljit Basra, Milton (CA); Ian Grzegorczyk, Waterloo (CA)

(73) Assignee: Geotab Inc., Oakville (CA)

( * ) Notice: Subject to any disclaimer, the term of this patent is extended or adjusted under 35 U.S.C. 154(b) by 0 days.

(21) Appl. No.: 18/628,010

(22) Filed: Apr. 5, 2024

Related U.S. Application Data

(60) Provisional application No. 63/567,631, filed on Mar. 20, 2024.

(51) Int. Cl.
  *G07C 5/08* (2006.01)
  *G08G 1/00* (2006.01)

(52) U.S. Cl.
  CPC .............. *G08G 1/20* (2013.01); *G07C 5/0808* (2013.01)

(58) Field of Classification Search
  CPC ................................ G08G 1/20; G07C 5/0808
  See application file for complete search history.

(56) References Cited

U.S. PATENT DOCUMENTS

| | | | |
|---|---|---|---|
| 6,512,465 B2 | 1/2003 | Flick | |
| 6,741,187 B2 | 5/2004 | Flick | |
| 6,744,384 B2 | 6/2004 | Flick | |
| 6,756,885 B1 | 6/2004 | Flick | |
| 6,784,809 B2 | 8/2004 | Flick | |
| 6,798,356 B2 | 9/2004 | Flick | |
| 6,803,861 B2 | 10/2004 | Flick | |
| 6,888,495 B2 | 5/2005 | Flick | |
| 6,957,133 B1 | 10/2005 | Hunt et al. | |
| 6,972,667 B2 | 12/2005 | Flick | |
| 7,257,396 B2 | 8/2007 | Olsen et al. | |
| 7,647,147 B2 | 1/2010 | Fortin et al. | |
| 7,671,727 B2 | 3/2010 | Flick | |
| 8,032,278 B2 | 10/2011 | Flick | |
| 9,754,426 B2 | 9/2017 | Meyer et al. | |
| 9,779,562 B1 | 10/2017 | Cook et al. | |
| 9,886,800 B2 | 2/2018 | Groß | |
| 10,255,575 B2 | 4/2019 | Warkentin et al. | |
| 10,572,542 B1 | 2/2020 | Conner | |
| 11,140,236 B2 | 10/2021 | Davis et al. | |
| 11,222,489 B2 | 1/2022 | Amendolagine et al. | |
| 11,310,069 B2 | 4/2022 | Xiao et al. | |
| 11,542,001 B1 | 1/2023 | Parodi et al. | |
| 11,710,355 B1 | 7/2023 | Wenneman et al. | |
| 11,736,312 B1 | 8/2023 | Xiao et al. | |
| 11,741,760 B1 | 8/2023 | Dubin et al. | |
| 11,748,377 B1 | 9/2023 | Zhang et al. | |
| 11,756,346 B1 | 9/2023 | Wu et al. | |
| 11,780,446 B1 | 10/2023 | Srinivasan et al. | |
| 11,787,413 B2 | 10/2023 | Tsai et al. | |
| 11,847,911 B2 | 12/2023 | Eihattab et al. | |

(Continued)

*Primary Examiner* — Michael V Kerrigan
(74) *Attorney, Agent, or Firm* — Sherif A. Abdel-Kader

(57) ABSTRACT

A method by a telematics device for identifying an asset platform for an asset coupled to the telematics device is provided. The asset has a multi-interface port and the telematics device determines the asset platform based on matching tags on both a primary interface and a secondary interface. Identifying the asset platform aids in obtaining asset data and avoiding operational interference.

20 Claims, 12 Drawing Sheets

(56) References Cited

U.S. PATENT DOCUMENTS

| | | |
|---|---|---|
| 2018/0182182 A1 | 6/2018 | Meyer et al. |
| 2020/0328910 A1* | 10/2020 | Peng .................. H04L 43/50 |
| 2022/0014601 A1 | 1/2022 | Davis et al. |
| 2022/0044500 A1 | 2/2022 | Yang et al. |
| 2022/0237958 A1 | 7/2022 | Tzamaloukas et al. |
| 2023/0171314 A1 | 6/2023 | Onti Srinivasan et al. |
| 2023/0401910 A1* | 12/2023 | Belsoeur .............. G07C 5/0808 |

* cited by examiner

DEVICE AND METHOD FOR ASSET PLATFORM DETERMINATION FOR AN ASSET WITH A MULTI-INTERFACE PORT

RELATED APPLICATIONS

This application claims priority from U.S. provisional application 63/567,631 filed on Mar. 6, 2024, the contents of which are herein incorporated by reference in their entirety.

FIELD

The present disclosure generally relates to asset telematics, and more specifically to a device and a method for asset platform determination for an asset with a multi-interface port.

BACKGROUND

A telematics system gathers asset data using a telematics device. The telematics device is coupled to an asset, usually at an interface port thereof. The asset may be a vehicle ("vehicular asset"). The telematics device collects the asset data from the asset via the interface port. In the case of a vehicular asset, the interface port is usually an onboard diagnostic (OBD) port. The asset data includes engine data, powertrain data, accessories data, entertainment system data, and so on. Additionally, the telematics device may gather sensor data pertaining to the asset via sensors on the telematics device. Furthermore, the telematics device may gather location data pertaining to the asset from a location module on the telematics device. When the telematics device is coupled to the asset, the gathered sensor data and location data pertain to the asset. The gathered asset data, sensor data and location data may be received and recorded by a technical infrastructure of the telematics system, such as a telematics server, and used in the provision of fleet management tools, for telematics services, or for further data analysis.

SUMMARY

In one aspect of the present disclosure, there is provided a method by a telematics device. The method comprises determining a primary asset interface of a plurality of interfaces on an interface port of an asset to which the telematics device is coupled, determining a secondary asset interface of the plurality of interfaces, detecting a first tag on the primary asset interface, detecting a second tag on the secondary asset interface, and determining an asset platform for the asset based on detecting the first tag on the primary asset interface and on detecting the second tag on the secondary asset interface.

Determining the primary asset interface may comprise detecting an asset activation event on a first interface of the plurality of interfaces.

Detecting the asset activation event may comprise for each interface of the plurality of interfaces, for each combination of an asset communication protocol of a plurality of asset communication protocols and a plurality of baud rates, attempting to detect the asset activation event.

Determining the secondary asset interface may comprise for each interface of the plurality of interfaces excluding the primary asset interface, for each combination of an asset communication protocol of a plurality of asset communication protocols and a baud rate of a plurality of baud rate, listening for intelligible asset data, and when intelligible asset data is detected on a current interface of the plurality of interfaces, designating the current interface of the plurality of interfaces as the secondary asset interface.

Determining the secondary asset interface may further comprise, when no intelligible asset data is detected in response to listening for intelligible asset data, for each interface of the plurality of interfaces excluding the primary asset interface, for each combination of an asset communication protocol of a plurality of asset communication protocols and a baud rate of a plurality of baud rates, sending a request for asset data on a current interface of the plurality of interfaces excluding the primary asset interface, and in response to receiving a response for the request, designating the current interface of the plurality of interfaces excluding the primary asset interface as the secondary asset interface.

Detecting the first tag on the primary asset interface may comprise one of detecting a first standard tag, which is broadcast on the primary asset interface, detecting a second standard tag in response to sending a standard request on the primary asset interface, and detecting an absence of a third standard tag for a predetermined duration on the primary asset interface.

Detecting the second tag on the secondary asset interface may comprise one of detecting a first proprietary broadcast tag on the secondary asset interface, detecting a second proprietary tag in response to sending a proprietary request on the secondary asset interface, and detecting an absence of a third proprietary broadcast tag for a predetermined duration on the secondary asset interface.

Determining the asset platform may comprise determining a first asset sub-platform based on detecting the first tag on the primary asset interface, determining a second asset sub-platform based on detecting the second tag on the secondary asset interface, and determining the asset platform from the first asset sub-platform and the second asset sub-platform.

The method may further comprise determining a tertiary asset interface of the plurality of interfaces. Determining the asset platform may comprise determining a first asset sub-platform based on detecting the first tag on the primary asset interface, determining a second asset sub-platform based on detecting the second tag on the secondary asset interface, determining a third asset sub-platform based on detecting a third tag on the tertiary asset interface, and determining the asset platform from the first asset sub-platform, the second asset sub-platform, and the third asset sub-platform.

In another aspect of the present disclosure, there is provided a telematics device for connecting with an asset. The telematics device comprises a controller, an asset interface coupled to the controller, the asset interface for connecting the telematics device with an asset communications bus of the asset, a network interface coupled to the controller, and a memory coupled to the controller. The memory stores machine-executable programming instructions which when executed by the controller configure the telematics device to determine a primary asset interface of a plurality of interfaces on an interface port of the asset, determine a secondary asset interface of the plurality of interfaces, detect a first tag on the primary asset interface, detect a second tag on the secondary asset interface, and determine an asset platform for the asset based on detecting the first tag on the primary asset interface and on detecting the second tag on the secondary asset interface.

The machine-executable programming instructions which configure the telematics device to determine the primary asset interface may comprise machine-executable programming instructions which configure the telematics device to detect an asset activation event on a first interface of the plurality of interfaces.

The machine-executable programming instructions which configure the telematics device to detect an asset activation event on a first interface of the plurality of interfaces may comprise machine-executable programming instructions which configure the telematics device to for each interface of the plurality of interfaces, for each combination of an asset platform of a plurality of asset communication protocols and a baud rate of a plurality of baud rates, attempt to detect the asset activation event.

The machine-executable programming instructions which configure the telematics device to determine the secondary asset interface may comprise machine-executable programming instructions which configure the telematics device to for each interface of the plurality of interfaces excluding the primary asset interface, for each combination of an asset communication protocol of a plurality of asset communication protocols and a baud rate of a plurality of baud rates, listen for intelligible asset data and when intelligible asset data is detected on a current interface of the plurality of interfaces, designating the current interface of the plurality of interfaces as the secondary asset interface.

The machine-executable programming instructions which configure the telematics device to determine the secondary asset interface may further comprise machine-executable programming instructions which configure the telematics device to when no intelligible asset data is detected in response to listening for intelligible asset data, for each interface of the plurality of interfaces excluding the primary asset interface, for each combination of an asset communication protocol of a plurality of asset communication protocols and a baud rate of a plurality of baud rates, send a request for asset data on a current interface of the plurality of interfaces excluding the primary asset interface, and in response to receiving a response for the request designate the current interface of the plurality of interfaces excluding the primary asset interface as the secondary asset interface.

The machine-executable programming instructions which configure the telematics device to detect the first tag on the primary asset interface may comprise one of: machine-executable programming instructions which configure the telematics device to detect a standard tag which is broadcast on the primary asset interface, machine-executable programming instructions which configure the telematics device to detect a standard tag in response to sending a standard request on the primary asset interface, and machine-executable programming instructions which configure the telematics device to detect an absence of a third standard tag for a predetermined duration on the primary asset interface.

The machine-executable programming instructions which configure the telematics device to detect the second tag on the secondary asset interface may comprise one of: machine-executable programming instructions which configure the telematics device to detect a proprietary broadcast tag on the secondary asset interface, machine-executable programming instructions which configure the telematics device to detect a proprietary tag in response to sending a proprietary request on the secondary asset interface, and machine-executable programming instructions which configure the telematics device to detect an absence of a third proprietary broadcast tag for a predetermined duration on the secondary asset interface.

The machine-executable programming instructions which configure the telematics device to determine the asset platform may comprise machine-executable programming instructions which configure the telematics device to: determine a first asset sub-platform based on detecting the first tag on the primary asset interface, determine a second asset sub-platform based on detecting the second tag on the secondary asset interface, and determine the asset platform from the first asset sub-platform and the second asset sub-platform.

The machine-executable programming instructions may further comprise machine-executable programming instructions which configure the telematics device to determine a tertiary asset interface of the plurality of interfaces, and wherein the machine-executable programming instructions which configure the telematics device to determine the asset platform comprise machine-executable programming instructions which configure the telematics device to detect a first asset sub-platform based on detecting the first tag on the primary asset interface, machine-executable programming instructions which configure the telematics device to detect a second asset sub-platform based on detecting the second tag on the secondary asset interface, machine-executable programming instructions which configure the telematics device to detect a third asset sub-platform based on detecting the at least one tag on the tertiary asset interface, and machine-executable programming instructions which configure the telematics device to determine the asset platform from the first asset sub-platform, the second asset sub-platform, and the third asset sub-platform.

In any of the preceding aspects, the tertiary asset interface may comprise a coupling harness that captures asset data by capacitive coupling.

BRIEF DESCRIPTION OF THE DRAWINGS

Exemplary non-limiting embodiments of the present disclosure are described with reference to the accompanying drawings in which.

DETAILED DESCRIPTION

Figure 1:
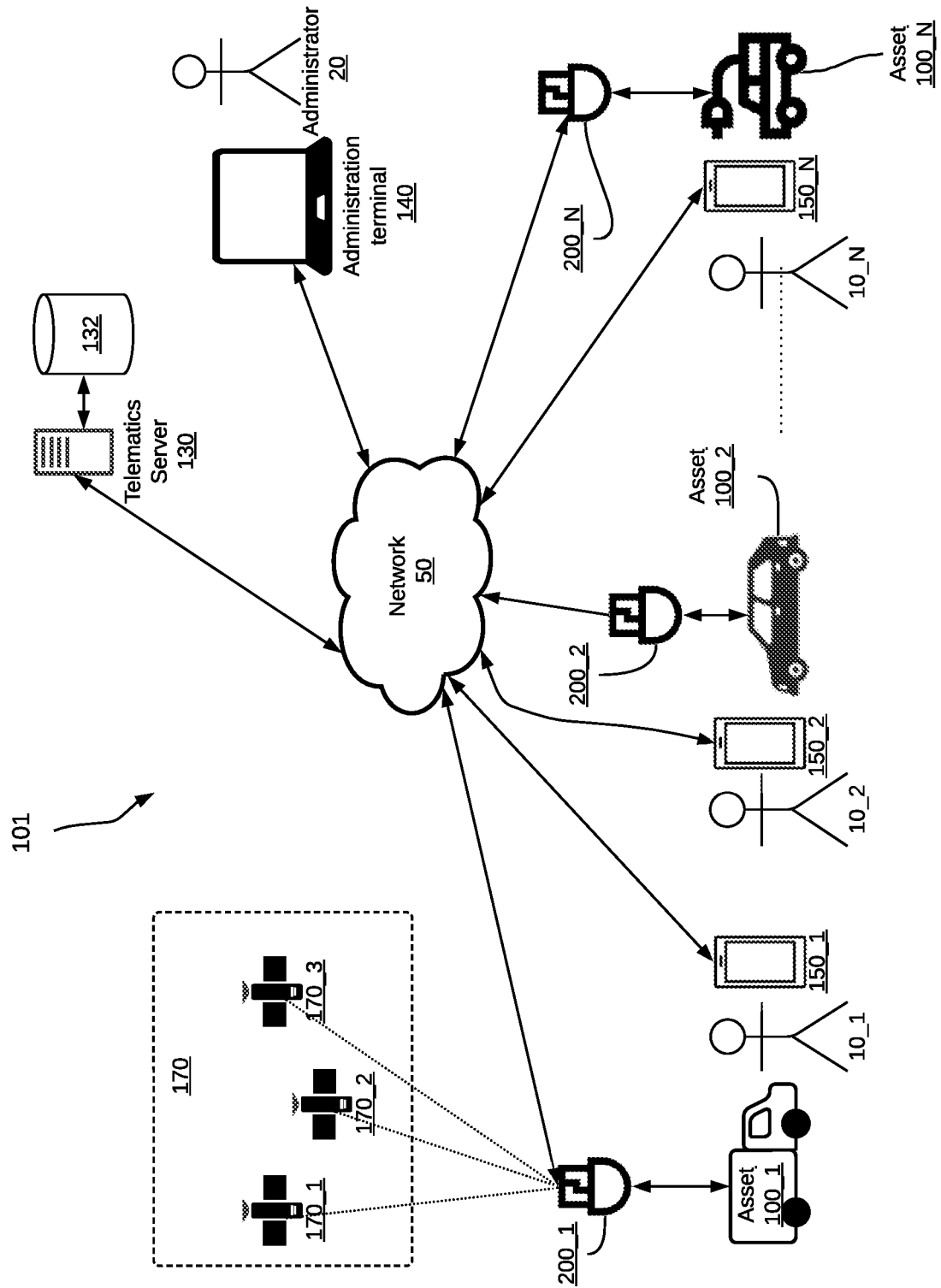
FIG. 1 is a schematic diagram of an exemplary telematics system including a plurality of telematics devices coupled to a plurality of vehicular assets.

The present disclosure relates to a device and method for asset platform determination for an asset with a multi-interface port.

An "asset" is a vehicle or a stationary piece of equipment that has an interface port for providing "asset data" relating thereto. Examples of assets include but are not limited to vehicles, industrial machinery, and medical devices. Assets contain Electronic Control Units (ECUs) that produce and/or consume asset data. Asset data comprises data relating to the operating condition of the asset. Embodiments will be discussed where the asset is a "vehicular asset", i.e., a vehicle. However, the asset tagging system as disclosed and claimed can work in other assets that provide asset data via an "interface port" thereof.

The "interface port" comprises one or more interfaces to one or more asset communications buses of the asset. An "asset communications bus" is an interconnect through which different ECUs of the asset exchange asset data. Asset data exchanged by the ECUs on the asset communications bus can be captured via the interface port. In a vehicular asset, the interface port typically comprises an On-Board Diagnostics (OBD) port. The asset communications bus of a vehicular asset is typically a Controller Area Network bus ("CAN bus").

An asset may contain multiple interface connections on the interface port thereof. This is the case when the asset has multiple asset communications buses each with an interface connection on the interface port. A "multi-interface port" is thus an interface port having multiple interface connections to multiple asset communications buses. For example, for a vehicular asset, there may be multiple CAN buses connecting the various ECUs. Each CAN bus may be connected to the OBD port via separate interface pins.

A "telematics device" is an electronic device that couples to an asset and gathers "asset data" therefrom. For a vehicular asset, the "asset data" comprises "vehicle data". Vehicle data includes engine data, powertrain data, accessories data, entertainment system data, and the like. A telematics device uses "asset data queries" to capture asset data. Making asset data queries comprise either listening for "broadcast asset data", or sending at least one "asset data request" to the asset requesting specific asset data then processing a received "asset data response" to obtain the asset data. An asset provides asset data using one or more asset communications protocols. In a vehicular asset, the telematics device uses "vehicle data queries" to capture vehicle data. Making a vehicle data query may comprise listening for a "broadcast vehicle data" sent on the CAN bus via the OBD port. The broadcast vehicle data is typically sent over the CAN bus as a "broadcast CAN data frame". Alternatively, making a vehicle data query may comprise sending a "vehicle data request" over the OBD port to the CAN bus, then processing a "vehicle data response" corresponding to the sent vehicle data request. A vehicle data request typically uses a standard protocol such as the OBD protocol.

In this disclosure, a "tag" represents data in the form of a signature or a data pattern used to assist in the identification of an asset platform. A "vehicle tag" represents a data pattern or signature used to assist in the identification of a vehicle platform. A vehicle tag is present in some vehicle data captured by the telematics device. The vehicle data containing a vehicle tag is either a broadcast vehicle data (e.g., a broadcast CAN data frame) or a vehicle data response to a vehicle data request.

Embodiments are described below using a telematics device connected to a vehicle. The telematics device is deployed in a telematics system used to gather vehicle data for the purpose of analysis, analytics, and fleet management. However, the device and method for determining an asset platform may also be used to determine an asset platform of non-vehicular assets for the purpose of optimally gathering asset data from such non-vehicular assets.

Telematics System

A telematics system is a technology that combines telecommunications and informatics to monitor and manage remote assets including vehicles and other equipment. A telematics system collects data from a number of assets through telematic devices. FIG. 1 shows a high-level block diagram of a telematics system 101. The telematics system 101 includes a telematics server 130, (N) telematics devices shown as telematics device 200_1, telematics device 200_2 . . . through telematics device 200_N ("telematics device 200"), a network 50, administration terminal 140, and operator terminals 150_1, 150_2 . . . through 150_N ("the operator terminals 150"). FIG. 1 also shows a plurality of (N) assets named as asset 100_1, asset 100_2 . . . asset 100_N ("asset 100") coupled to the telematics device 200_1, telematics device 200_2 . . . telematics device 200_N, respectively. Additionally, FIG. 1 shows a plurality of satellites 170_1, 170_2 and 1703 ("the satellites 170") in communication with the telematics devices 200 for facilitating navigation.

The assets 100 shown are in the form of vehicles. For example, the asset 100_1 is shown as a truck, which may be part of a fleet that delivers goods or provides services. The asset 100_2 is shown as a passenger car. The asset 100_3 is shown as an electric vehicle (EV). Other types of vehicles, which are not shown, are also contemplated in the various embodiments of the present disclosure, including but not limited to, farming vehicles, construction vehicles, military vehicles, and the like. Most vehicles currently use internal combustion engines (ICEs) including spark-ignition ("gasoline") and compression-ignition ("diesel") engines. Both gasoline and diesel engines utilize the reciprocating motion of one or more pistons in a cylinder. Gasoline and diesel engines can use either a four-stroke cycle or a two-stroke cycle. A less commonly used ICE is the rotary ("Wankel") engine. Electric vehicles (EVs) come in many types. Battery Electric Vehicles (BEVs) are fully electric vehicles that rely solely on electricity for propulsion. They are equipped with large battery packs that store electricity, which is used to power an electric motor. Hybrid Electric Vehicles (HEVs) have both an internal combustion engine and an electric motor but cannot be charged externally. They rely on regenerative braking to charge a small battery that assists the internal combustion engine during acceleration and provides additional power when needed. Plug-in Hybrid Electric Vehicles (PHEVs) combine an internal combustion engine (usually gasoline) with an electric motor and a larger battery pack. They can be charged from an electrical outlet, allowing them to operate in electric-only mode for a certain range before switching to the internal combustion engine. Extended-Range Electric Vehicles (EREVs) are similar to PHEVs but typically have larger battery packs, allowing for a longer electric-only range. When the battery is depleted, an inboard gasoline engine acts as a generator to recharge the battery and provide electricity for the electric motor. The gasoline engine doesn't directly drive the wheels, making EREVs functionally electric for most of their use. Fuel Cell Electric Vehicles (FCEVs) use hydrogen gas as a fuel source, which is combined with oxygen from the air in a fuel cell to produce electricity to power an electric motor. The only emissions from FCEVs are water vapor. Solar-powered electric vehicles incorporate solar panels on their roofs or other surfaces. These panels generate electricity from sunlight, which can supplement the vehicle's battery charge.

While the assets shown in FIG. 1 are all land vehicles, this is not necessarily the case. An asset may also be a marine vehicle or an airborne vehicle employing an ICE, an electric motor, or any other engine such as a jet engine, a rocket propulsion engine, and so on. In some cases, an asset is a stationary machine such as a generator, a concrete mixer, a compressor, and the like.

The telematics devices 200 are coupled to assets 100. For example, in FIG. 1 the telematics device 200_1 is coupled to the asset 100_1. Similarly, the telematics device 200_2 is coupled to the asset 100_2 and the telematics device 200_3 is coupled to the asset 100_3. The components of a telematics device 200 are explained in further detail with reference to FIG. 2.

The network 50 may be a single network or a combination of networks such as a data cellular network, the Internet, and other network technologies. The network 50 may provide connectivity between the telematics devices 200 and the telematics server 130, between the administration terminal 140 and the telematics server 130, and between the operator terminals 150 and the telematics server 130.

In some implementations of the telematics system 101, the network 50 is a cellular network utilizing cellular technology. In one implementation, the network 50 uses the second-generation (2G) cellular technology which is based on the Global System for Mobiles (GSM) protocol and supports data transmission protocols such as the General Packet Radio Service (GPRS) or the Enhanced Data rates for GSM Evolution (EDGE). In another implementation, the network 50 uses the Third-generation (3G) cellular technology utilizing the Universal Mobile Telephone System (UMTS) supporting data transfer using the High Speed Packet Access (HSPA) protocol. In yet another implementation, the network 50 uses the Fourth-generation cellular technology (4G) which uses the Long Term Evolution (LTE) protocol. In another implementation, the network 50 uses the Fifth-generation (5G) cellular technology. In yet another implementation, the network 50 uses the Narrowband Internet of Things (NB-IoT) which is a low-power wide-area network (LPWAN) technology that is part of the Third Generation Partnership Project (3GPP) standard.

In some implementations of the telematics system 101, the network 50 comprises a Wide Area Network (WAN) using non-cellular WAN technologies. One example of a non-cellular WAN technology that the network 50 can use is the Worldwide Interoperability For Microwave Access (WiMAX™) which is based on the Institute of Electrical and Electronics Engineers (IEEE) 810.16 family of standards. Another example of a non-cellular WAN technology that the network 50 may use is Long Range Wide Area Network (LoRaWAN™) technology which is a low-power WAN protocol. Yet another example of a non-cellular WAN technology that the network 50 may use is Weightless which is a family of open standard low-power WAN (LPWAN) technology that operate in the sub-GHz frequency bands.

In some implementations, the network 50 is a combination of the above-specified technologies.

The telematics server 130 is an electronic device executing machine-executable programming instructions which enable the telematics server 130 to store and analyze telematics data. The telematics server 130 may be a single computer system or a cluster of computers. In some implementations, the telematics server 130 utilizes an operating system such as Linux, Windows, Unix, Free Berkely Software Distribution (FreeBSD), macOS Server, VMware ESXI, Microsoft Hyper-V Server, Oracle Solaris, International Business Machines (IBM) AIX, or any other equivalent operating system. In other implementations, the telematics server 130 is implemented on a cloud computing platform, such as Amazon Web Service (AWS), Microsoft Azure, Google Cloud Platform (GCP), IBM Cloud, Oracle Cloud, and Alibaba Cloud. The telematics server 130 is connected to the network 50 and is capable of receiving telematics data from the telematics devices 200. In some implementations, the telematics server 130 has a plurality of software modules for performing data analysis and analytics on the telematics data to obtain useful asset information about the assets 100. In some implementations, the telematics server 130 is coupled to a telematics database 132 for storing telematics data and/or the results of the analytics which are related to the assets 100. In some implementations, the asset information stored includes operator information about the operators 10 corresponding to the assets. In some implementations, the telematics server 130 communicates the asset data and/or the operator information pertaining to an asset 100 to the administration terminal 140 and/or the operator terminal 150.

The satellites 170 are part of a global navigation satellite system (GNSS) which is a satellite-based navigation system that provides positioning, navigation, and timing services worldwide. The four primary GNSS systems in operation today are Global Positioning System (GPS), Global Navigation Satellite System (GLONASS), Galileo, and BeiDou. GPS was developed and operated by the United States, GLONASS is the Russian counterpart of GPS, Galileo is the European Union's GNSS, and BeiDou is the Chinese GNSS system. Other less commonly used GNSS systems are QZSS (Japan) and IRNSS or NavIC (India). The location information may be processed by a location module on the telematics device 200 to provide location data indicating the location of the telematics device 200 (and hence the location of the asset 100 coupled thereto). In other implementations (not shown), the telematics device 200 may use other means to determine the location thereof as outlined below.

The administration terminal 140 is an electronic device capable of connecting to the telematics server 130, over the network 50. The administration terminal 140 can be configured to retrieve data and analytics related to one or more assets 100; to receive alerts from the telematics server 130 in respect of one or more conditions on the telematics device 200; and/or to issue commands to one or more telematics device 200 via the telematics server 130. The administration terminal 140 is shown as a laptop computer, however, this is not necessarily the case. An administration terminal is any one of: a desktop computer, an industrial human-machine interface (HMI), a touch screen panel, a table, a smartphone, an Augmented Reality (AR) headset, and a Network Operations Center (NOC). In some implementations, the administration terminal 140 runs a web browser or a custom application which allows retrieving data and analytics, pertaining to one or more assets 100, from the telematics server 130 via a web interface of the telematics server 130. In some implementations, the administration terminal 140 is used to issue commands to one or more telematics device 200 via the telematics server 130. In some implementations, an administrator 20 communicates with the telematics server 130 using the administration terminal 140. In addition to retrieving data and analytics, the administration terminal 140 allows the administrator 20 to set alerts and geofences for keeping track of the assets 100, receiving notifications of deliveries, receiving notifications of vehicle conditions, and receiving alerts pertaining to driver behavior.

The operator terminals 150 are electronic devices, similar to the administration terminals 140. The operator terminals 150 are shown as smartphones, however, this is not necessarily the case. An administration terminal is any one of: a desktop computer, an industrial human-machine interface (HMI), a touch screen panel, a table, a smartphone, an Augmented Reality (AR) headset, and a Network Operations Center (NOC). The operator terminals 150 are used by operators 10 (for example, vehicle drivers) of the assets 100 to both track and configure the usage of the assets 100. For example, as shown in FIG. 1, the operator 10_1 has the operator terminal 150_1, the operator 10_2 has the operator terminal 1502, and the operator 10_N has the operator terminal 150_N. Assuming the operators 10 all belong to a fleet of vehicles, each of the operators 10 may operate any of the assets 100. For example, FIG. 1 shows that the operator 10_1 is associated with the asset 100_1, the operator 10_2 is associated with the asset 100_2, and the operator 10_N is associated with the asset 100_N. However, any operator 10 may operate any asset 100 within a particular group of assets, such as a fleet. The operator terminals 150 are in communication with the telematics server 130 over the network 50. The operator terminals 150 may run at least one asset configuration application. The asset configuration application may be used by operator 10 to inform the telematics server 130 that asset 100 is currently being operated by operator 10. For example, the operator 10_2 may use an asset configuration application on the operator terminal 150_2 to indicate that the operator 10_2 is currently using the asset 100_2. The telematics server 130 updates the telematics database 132 to indicate that the asset 100_2 is currently associated with the operator 10_2. Additionally, the asset configuration application may be used to report information related to the operation duration of the vehicle, the number of stops made by the operator during their working shift, and so on. Furthermore, the asset configuration application may allow the operator to configure the telematics device 200 coupled to the asset 100 that the operator 10 is operating.

In operation, a telematics device 200 is coupled to an asset 100 to capture asset data. In some implementations, the asset data is combined with location data obtained by the telematics device 200 from a location module in communication with the satellites 170 and/or sensor data gathered from sensors in the telematics device 200 or another device coupled to the telematics device 200. The combined asset data, location data, and sensor data are termed "telematics data." The telematics device 200 sends the telematics data to the telematics server 130 over the network 50. The telematics server 130 processes, aggregates, and/or analyzes the telematics data to generate asset information pertaining to the assets 100 or to a fleet of assets. In some implementations, the telematics server 130 stores the telematics data and/or the generated asset information in the telematics database 132. In some implementations, the administration terminal 140 connects to the telematics server 130, over the network 50, to access the generated asset information. In other implementations, the telematics server 130 pushes the generated asset information to the administration terminal 140. In some implementations, the operators 10 use the operator terminals 150 to indicate to the telematics server 130 which assets 100 they are associated with. In response, the telematics server 130 updates the telematics database 132 to associate an operator 10 with an asset 100. In some implementations, the telematics server 130 provides additional analytics related to the operators 10 including work time, location, and operating parameters. For example, for vehicle assets, the telematics data may include turning, speeding, and braking information. The telematics server 130 can correlate the telematics data to the vehicle's driver by querying the telematics database 132 for a particular vehicle and retrieving the associated driver information. In some implementations, an administrator 20 uses the administration terminal 140 to set alerts for certain activities pertaining to the assets 100. When criteria for an alert is met, the telematics server 130 sends a message to the administration terminal 140 to notify an administrator 20. In some implementations, the telematics server 130 sends alerts to the operator terminal 150 to notify an operator 10 of the alert. For example, a vehicle driver operating the vehicle outside of a service area or hours of service (HOS) may receive an alert on their operator terminal 150. In some implementations, an administrator 20 uses the administration terminal 140 to configure a telematics device 200 by issuing commands thereto via the telematics server 130. In some implementations, the telematics server 130 sends alerts to the telematics device 200 to generate an alert to the driver such as a beep, a displayed message, or an audio message.

Figure 2:
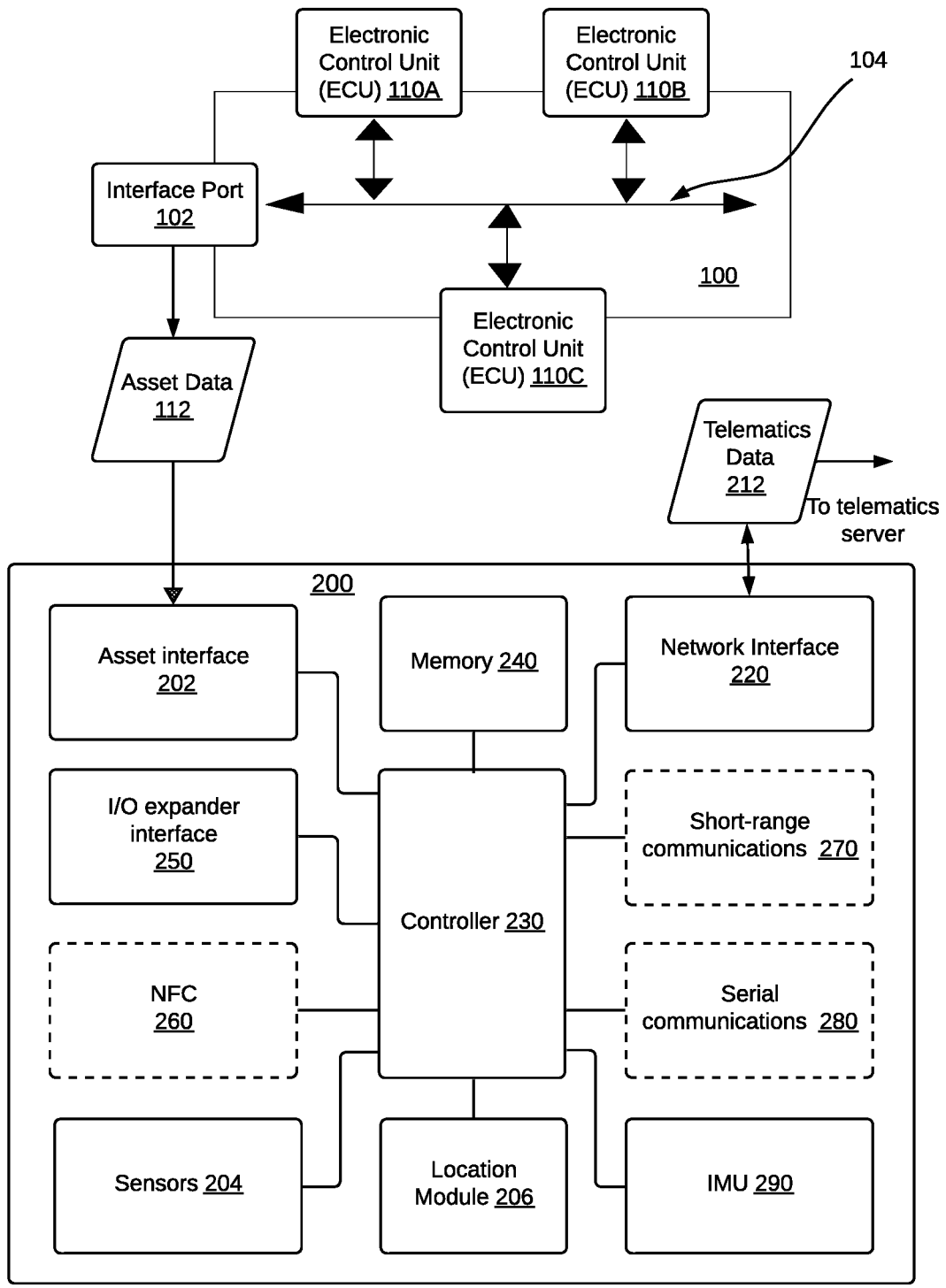
FIG. 2 is a block diagram showing a telematics device coupled to an asset's communications bus via an interface port.

The asset 100 may have a plurality of electronic control units (ECUs). A vehicle may, for example, have around seventy ECUs. For simplicity, only a few of the ECUs 110 are depicted in FIG. 2. For example, in the depicted embodiment the asset 100 has three ECUs shown as the ECU 110A, the ECU 110B, and the ECU 110C ("the ECUs 110"). The ECU 110A, the ECU 110B, and the ECU 110C are shown to be interconnected via an asset communications bus.

The most commonly used type of asset communications bus is the Controller Area Network (CAN) bus. CAN is a robust and standardized communication protocol designed for real-time control applications. The CAN bus is a physical bus used to connect various ECUs and sensors, allowing them to exchange data and commands. CAN bus ensures that different vehicle systems can work together seamlessly. ECUs are connected to the CAN bus using dedicated CAN transceivers and connectors.

Another type of asset communications bus is the Local Interconnect Network (LIN) bus, which is used for slower-speed communication between certain ECUs, particularly for non-critical functions like interior lighting and seat controls. FlexRay is another communication protocol used in some high-performance and safety-critical applications. It provides faster data rates and deterministic communication, making it suitable for advanced driver assistance systems (ADAS) and other critical functions. In some modern vehicles, particularly those with advanced infotainment systems and autonomous driving features, Ethernet networks are used to handle high-bandwidth data communication. As such, while this disclosure discusses CAN and related protocols, it would be apparent to those of skill in the art that the methods described herein are applicable to the aforementioned protocols and similar protocols.

As discussed above, the most commonly used type of an asset communications bus is the CAN bus. For example, in FIG. 2 the ECUs 110 are interconnected using the CAN bus 104. The ECUs 110 send and receive vehicle data to one another in CAN data frames by placing the information on the CAN bus 104. When an ECU 110 places vehicle data on the CAN bus 104, other ECUs 110 receive the information and may or may not consume or use that vehicle data.

A number of asset communication protocols may be used to exchange information between the ECUs over an asset communications bus. For a vehicular asset, a number of automotive protocols may be used to exchange information over a CAN bus. For example, ECUs 110 in trucks and heavy vehicles use the Society of Automotive Engineering (SAE) J1939 protocol to exchange information over a CAN bus 104. J1939 is based on CAN and is used for diagnostic and communication purposes. Most passenger vehicles use the SAE J1979 protocol, which is commonly known as On-Board Diagnostic II (OBD-II) protocol to exchange information between ECUs 110 on their CAN bus 104. OBD-II is a standardized diagnostic protocol used in most vehicles manufactured since the late 1990s. OBD-II provides a common interface for diagnostic tools to communicate with a wide range of ECUs in the vehicle, including the engine control module (ECM), transmission control module (TCM), and more. OBD-II allows for reading diagnostic trouble codes (DTCs), live data, and performing various diagnostic tests. The Unified Diagnostics Services (UDS) protocol is a diagnostic protocol that operates over various physical layers, including CAN, LIN, and FlexRay. ISO 9141 is an older diagnostic protocol that was commonly used in vehicles manufactured in the 1990s and early 2000s. ISO 9141 has largely been replaced by OBD-II but is still encountered in some older vehicles. The Keyword Protocol 2000 (KWP2000) is another older protocol that was used for vehicle diagnostics, particularly in European vehicles. Like ISO 9141, it has been largely replaced by OBD-II. Some automakers, such as General Motors (GM) and Ford, have their proprietary diagnostic protocols for communication with ECUs in their vehicles. GM has a GMLAN protocol and Ford has a Ford Standard Corporate Protocol (SCP). Similarly, Volkswagen Auto Group-Communication (VAG-COM) is a proprietary diagnostic protocol used in Volkswagen Auto Group (VAG) vehicles, including VW, Audi, SEAT, and Skoda. Diagnostics over Internet Protocol (DoIP) is a newer diagnostic protocol that leverages Ethernet or IP-based networks for vehicle diagnostics. DoIP is used in some modern vehicles with advanced electronic systems.

An asset 100 may allow access to information exchanged over the CAN bus 104 via an interface port 102. For example, if the asset 100 is a passenger car, then the interface port 102 is most likely an OBD-II port. Vehicle data accessible through the interface port 102 is a form of asset data 112 when the asset 100 is a vehicular asset. In some implementations, the interface port 102 includes a power interface for providing electric power to a telematics device 200 connected thereto.

Telematics Device

Further details relating to the telematics device 200 and how it interfaces with an asset 100 are shown with reference to FIG. 2. FIG. 2 depicts an asset 100 and a telematics device 200 coupled thereto. Selected relevant components of each of the asset 100 and the telematics device 200 are shown.

The telematics device 200 includes a controller 230 coupled to a memory 240, an asset interface 202, and a network interface 220. The telematics device 200 also includes one or more sensors 204 and a location module 206 coupled to the controller 230. In some implementations, the telematics device 200 contains an inertial measurement unit, shown as the IMU 290. The telematics device 200 may also contain some optional components, shown in dashed lines in FIG. 2. For example, the telematics device 200 may contain one or more of: a near-field communications (NFC) module such as NFC module 260, a short-range wireless communications module 270, and a wired communications module such as a serial communications module 280. In some embodiments (not shown), the telematics device 200 may have a dedicated power source or a battery. In other embodiments, the telematics device 200 may receive power directly from the asset 100, via the interface port 102. Some of the components shown in solid lines may also be optional and may be implemented in separate modules. For example, some telematics devices (not shown) may not have a location module 206 and may rely on an external location module for obtaining the location data. Some telematics devices may not have any sensors 204 and may rely on external sensors for obtaining sensor data.

The controller 230 may include one or any combination of a processor, a microprocessor, a microcontroller (MCU), a central processing unit (CPU), a System-on-Chip (SOC), a processing core, a state machine, a logic gate array, an application-specific integrated circuit (ASIC), a field-programmable gate array (FPGA), or any other hardware component or combination of hardware components capable of executing machine-executable programming instructions. The controller 230 may follow a Von Neumann Architecture, a Harvard Architecture, or a Modified Harvard Architecture. The controller 230 may be a Complex Instruction Set Computer (CISC) processor supporting a complex instruction set that can perform multiple operations in a single instruction. Alternatively, the controller 230 may be a Reduced Instruction Set Computer (RISC) processor having a simplified and streamlined instruction set, and employs a pipeline architecture to optimize execution. The controller 230 may have a single processor core or multiple processor cores supporting parallel execution of instructions. The controller 230 may have an internal memory for storing machine-executable programming instructions to be executed by the controller 230 to carry out the steps of the methods described in this disclosure.

The memory 240 is an electronic storage component that enables storage of data and machine-executable programming instructions. The memory 240 may be a read-only-memory (ROM) including a Programmable ROM (PROM), and Erasable Programmable ROM (EPROM), Electrically Erasable Programmable ROM (EEPROM), or Flash memory. The memory 240 may be a random access memory (RAM) including Static RAM (SRAM) and Dynamic RAM (DRAM). Alternatively, the memory 240 may be a Ferroelectric RAM (FRAM), a Magnetic Random Access Memory (MRAM), or a Phase-Change Memory (PCM). The memory 240 may also be any combination of the aforementioned types. The memory 240 is for storing machine-executable programming instructions and/or data to support the functionality described in this disclosure. The memory 240 is coupled to the controller 230, via a memory bus, thus enabling the controller 230 to execute the machine-executable programming instructions stored in the memory 240 and to access the data stored therein.

The location module 206 determines the location of the telematics device 200. The location data may be in the form of a latitude and longitude, in Universal Transverse Mercator (UTM) coordinates, or any other similar form.

In some implementations, the location module 206 is a GNSS transceiver supporting one or more of the aforementioned GNSS technologies. The location module 206 may be integrated into the controller 230 or coupled to the controller 230 by a serial interface such as the Serial Peripheral Interface (SPI), the Inter-Integrated Circuit (I2C), Universal Asynchronous Receiver Transmitter (UART), Universal Serial Bus (USB), and Secure Digital Input/Output (SDIO).

In other implementations, the location module 206 determines the location of the telematics device 200 from a cellular network using cell tower triangulation. In this case, the location module 206 is a firmware module that computes location based on information received from the network interface 220, which in this case is a cellular modem providing signal measurements from multiple nearby cell towers. The location module 206 uses the signal measurements to estimate the location of the telematics device 200. The location data determined by the location module 206 is sent to the controller 230.

The sensors 204 may be one or more of: a temperature sensor, a pressure sensor, an optical sensor, a humidity sensor, a gas sensor, an acoustic sensor, a pH sensor, a soil moisture sensor, or any other suitable sensor indicating a condition pertaining to the asset 100 to which the telematics device 200 is coupled. The sensors 204 are coupled to the controller via any one of serial, parallel, or bus technologies. For example, some of the sensors 204 may connect to the controller 230 via a parallel interface. Other sensors 204 may connect to the controller 230 via a bus using any one of the known bus technologies such as the Industry Standard Architecture (ISA), Extended ISA (EISA), Micro Channel Architecture (MCA), Video Electronics Standards Association (VESA), Peripheral Component Interconnect (PCI), PCI Express (PCI-X), Personal Computer Memory Card Industry Association (PCMCIA), Accelerated Graphics Port (AGP), and Small Computer Systems Interface (SCSI). The sensors 204 may connect to the controller via a serial link such as a Universal Asynchronous Receiver Transmitter (UART), Serial Peripheral Interface (SPI), or Inter-Integrated Circuit (I2C). The sensors 204 provide sensor data to the controller 230. Some telematics devices may not have any sensors 204 and may only provide location information and/or IMU information. Some telematics devices may have the capability of pairing with external sensors via a wired or a wireless interface.

The asset interface 202 is a hardware subsystem that allows the telematics device 200 to read asset data 112 from the interface port 102 of the asset 100 and also to send asset data requests to one or more ECUs requesting asset data. Some asset data requests may be in the form of configuration commands that configure the ECUs 110 in a particular way to adjust the performance of the vehicle, for example. In some implementations the asset interface 202 receives power from the asset 100 via the interface port 102 for powering the telematics device 200. In the case of an asset employing a CAN bus 104, the asset interface 202 includes an interface connector and at least one CAN transceiver.

In some implementations, the interface connector of the asset interface 202 is an OBD-II connector configured to mate with a corresponding OBD-II connector of the interface port 102 of the asset 100, which in this case would be an OBD-II port. On a CAN bus 104, data is exchanged over two signal lines named CANH (CAN High) and CANL (CAN Low).

Figure 3:
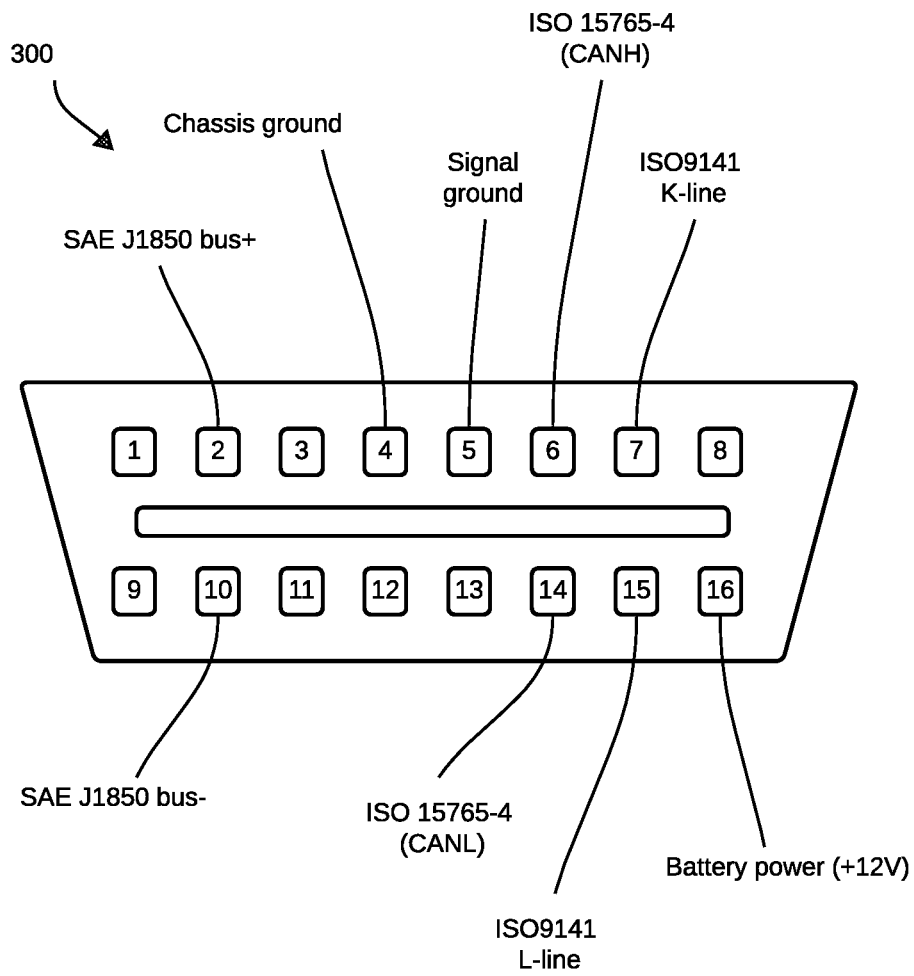
FIG. 3 depicts an exemplary On Board Diagnostics II (OBD-II) connector.

A typical OBD-II port on an asset has a number of pins including at least one CANH pin and a CANL pin. FIG. 3 depicts the pinout of a vehicle J1962 16-pin connector, also referred to as an OBD-II port 300. As shown in FIG. 3, the OBD-II connector 400 has different signal lines which may be used by different protocols. Signal line 1 is known as the SAE J1850 bus+ ("J1850+") signal line and signal line 2 is known as the SAE J1850 bus− ("J1850−") signal. The J1850+/J1850− signal lines are used by the Variable Pulse Width (VPW) protocol and the Pulse Width Modulation (PWM) protocol. Signal line 7 is known as the ISO9141 K-line ("K-line") signal line while signal line 15 is known as the ISO9141 L-line ("L-line") signal line. The K-line and L-line are used by the ISO9141 protocol and the ISO14230 protocol. Signal line 6 is the ISO 15765-4 CAN High ("CANH") signal line while signal line 14 is the ISO 15765-4 CAN Low ("CANL") signal line. The CANH and CANL signal lines are used by the CAN protocol. Signal line 16 is the battery voltage which is usually +12V. Signal line 5 is the signal ground.

Figure 4:
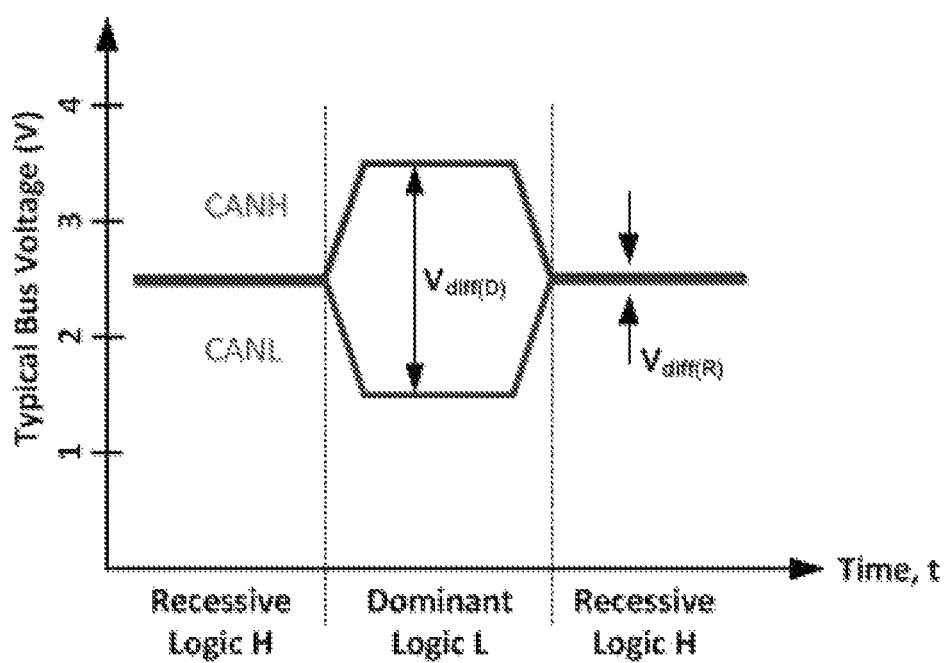
FIG. 4 is a graph depicting the logic voltage levels of Controller Area Network (CAN) signals.

A CAN transceiver converts CAN-level signals at the interface port 102 to digital-level signals that can be read by the controller 230. Conversely, the CAN transceiver also converts digital-level signals output by the controller 230 to CAN-level signals that are sent to the CAN bus 104 over the interface port 102. Digital-level signals are typically 5V or 3.3V for logic "1" or HIGH, and 0V for logic "0" or LOW. CAN logic levels are shown in FIG. 4. Data on a CAN bus is represented by the CANH and CANL signals. As shown in FIG. 4, the CAN interface defines logic "0" ("LOW") as the dominant state, and logic "1" ("HIGH") as the recessive state. In the dominant state, the CANH signal is set to a voltage of 3.5V while the CANL signal is set to a voltage of 1.5V. In the recessive state, the CANH and the CANL are both set to 2.5V. A CAN transceiver converts a logic LOW on the CAN bus to a digital LOW signal at 0V, and converts a Logic HIGH on the CAN bus to a digital HIGH signal at a positive voltage (e.g., 5V).

Turning back to FIG. 2, the IMU 290 is an inertial measurement unit. The IMU 290 is a device used to measure and provide information about the telematics device's motion, orientation, and acceleration. The IMU 290 may be comprised of several components working together. For example, the IMU 290 may be comprised of one or more of: an accelerometer, a gyroscope, a magnetometer, and a barometer. An accelerometer measures linear acceleration in three axes (typically X, Y, and Z). A gyroscope measures the angular velocity or rate of rotation around each of the three axes. A magnetometer measures the strength and direction of a magnetic field and thus determines the heading or orientation relative to the Earth's magnetic field. A barometer measures the atmospheric pressure and that can be used to estimate changes in altitude. Some IMUs contain a microcontroller or a processor that runs sensor fusion algorithms to combine and process the data from the various above-mentioned sensors. Some IMUs contain embedded machine learning cores (MLCs). An MLC is an in-sensor engine with a classification-based AI algorithm (decision tree) that can run different tasks while the sensors are detecting motion data. Examples of IMUs with MLCs include the iNEMO inertial modules by STMicroelectronics™. Some IMUs contain a communication interface to interface with an external microcontroller or processor. Some telematic devices may not contain an IMU unit and may report motion determined from the change in location reported by the location module 206.

The IMU 290 may be integrated into the controller 230 or may be a separate component that communicates with the controller 230 via a parallel interface, a serial interface using any one of the above-mentioned serial technologies, a bus interface using any one of the above-mentioned bus technologies. Alternatively or additionally, the IMU 290 may connect directly to General Purpose Input/Output (GPIO)

and/or interrupt pins of the controller 230. The controller 230 can configure the IMU 290 by sending configuration commands thereof. Additionally, the controller 230 can query the status of the IMU 290 generally or in response to receiving an interrupt signal therefrom.

In some implementations, the network interface 220 includes a cellular modem utilizing cellular technology. In one implementation, the network interface 220 uses the second-generation (2G) cellular technology which is based on the Global System for Mobiles (GSM) protocol and supports data transmission protocols such as the General Packet Radio Service (GPRS) or the Enhanced Data rates for GSM Evolution (EDGE). In another implementation, the network interface 220 uses the Third-generation (3G) cellular technology utilizing the Universal Mobile Telephone System (UMTS) supporting data transfer using the High Speed Packet Access (HSPA) protocol. In yet another implementation, the network interface 220 uses the Fourth-generation cellular technology (4G) which uses the Long Term Evolution (LTE) protocol. In another implementation, the network interface 220 uses the Fifth-generation (5G) cellular technology. In yet another implementation, the network interface 220 uses the Narrowband Internet of Things (NB-IoT) which is a low-power wide-area network (LPWAN) technology that is part of the Third Generation Partnership Project (3GPP) standard.

In some implementations, the network interface 220 comprises a Wide Area Network (WAN) modem using non-cellular WAN technologies. The network interface 220 may use non-cellular WAN technologies. One example of a non-cellular WAN technology that the network interface 220 can use is the Worldwide Interoperability For Microwave Access (WiMAX™) which is based on the IEEE 810.16 family of standards. Another example of a non-cellular WAN technology that the network interface 220 may use is Long Range Wide Area Network (LoRaWAN™) technology which is a low-power WAN protocol. Yet another example of a non-cellular WAN technology that the network interface may use is Weightless which is a family of open standard low-power WAN (LPWAN) technology that operate in the sub-GHz frequency bands.

In some implementations, the network interface 220 uses a wired network technology when the telematics device 200 is coupled to an asset that provides wired network connectivity. Examples of wired network technologies include Ethernet, Fast Ethernet, Local Talk™, Token Ring, Fiber Distributed Data Interface (FDDI), and Asynchronous Transfer Mode (ATM).

The network interface 220 may be integrated into the controller or coupled thereto via a parallel interface, a serial interface using any one of the above-mentioned serial technologies, a bus interface using any one of the above-mentioned bus technologies, or may connect directly to General Purpose Input/Output (GPIO) and interrupt pins of the controller 230.

The network interface 220 allows the telematics device 200 to send/receive data to/from remote devices such as the telematics server 130.

The short-range wireless communications module 270 is a component intended for providing short-range wireless communication capability to the telematics device 200. The short-range wireless communications module 270 comprises at least one of a Bluetooth™ module, a wireless fidelity (Wi-Fi™) module, a Zigbee™ module, a Z-Wave module, and a Radio Frequency Identification (RFID™). Alternatively, the short-range wireless communications module 270 comprises any other short-range wireless communications module. Bluetooth is a widely used wireless technology for short-range communication between devices. Bluetooth operates in the 2.4 GHz frequency band and supports different versions with varying data rates and ranges. Wi-Fi is a wireless communication technology commonly used for local area network (LAN) connectivity. Wi-Fi operates in different frequency bands, including 2.4 GHz and 5 GHz, and offers higher data rates compared to Bluetooth. Zigbee is a low-power wireless communication protocol designed for short-range communication in wireless sensor networks, which operates on the IEEE 810.15.4 standard. Z-Wave is a wireless communication technology that operates in the sub-GHz frequency range, allowing for longer range and better penetration through walls compared to some other wireless technologies. RFID is a technology that uses electromagnetic fields to identify and track objects or individuals wirelessly. It consists of tags or labels that store data and readers that transmit and receive signals to interact with the tags. The short-range wireless communications module 270 allows other devices to communicate with the telematics device 200 over a short-range wireless network. For example, external wireless sensors may send sensor data to the telematics device 200 via the short-range wireless communications module 270.

The NFC module 260 is a Near Field Communication (NFC™) module. NFC is a short-range wireless communication technology that enables devices to establish communication and exchange data when they are in close proximity to each other. In some implementations, the NFC module 260 is an NFC reader which can read information stored on an NFC tag. The NFC module 260 can be used to confirm the identity of the operator 10 by having the operator 10 tap an NFC tag onto the telematics device 200 such that the NFC tag is read by the NFC module 260.

The serial communications module 280 is an example of a wired communications module. The serial communications module 280 is an electronic peripheral for providing serial wired communications to the telematics device 200. For example, the serial communications module 280 may be one of a Universal Asynchronous Receiver Transmitter (UART), a Serial Peripheral Interface (SPI), an Inter-Integrated Circuit (I2C) module, a Controller Area Network (CAN) transceiver, or an RS-232 transceiver. A UART enables synchronous data transmission between devices and supports relatively low data rates. SPI is a synchronous serial communication protocol that allows devices to exchange data in full-duplex mode. I2C is a serial communication protocol that enables devices to communicate using a two-wire interface. CAN is a serial communication bus commonly used in automotive and industrial applications. In some implementations, the telematics device 200 accepts connections from input/output devices that use the CAN protocol. In some implementations, the serial communications module 280 allows an external device to connect with the telematics device 200 for downloading asset data 112 therefrom. In some implementations, the serial communications module allows external sensors to send sensor data to the telematics device 200.

In operation, ECUs 110 communicate asset data 112 over the asset communications bus. The telematics device 200 captures asset data 112 over the asset communications bus via the interface port 102. As an example, an ECU 110, such as the ECU 110A, the ECU 1101B, or the ECU 110C places CAN data over the CAN bus 104. The asset data exchanged between the ECUs 110, over the CAN bus 104 is accessible via the interface port 102 and may be retrieved as the asset data 112 by the telematics device 200. The controller 230 of the telematics device 200 receives the asset data 112 via the asset interface 202. In some implementations, the controller 230 receives sensor data from the sensors 204 and/or location data from the location module 206. The controller 230 combines the asset data 112 with the sensor data and the location data to obtain the telematics data 212. The controller 230 transmits the telematics data 212 to the telematics server 130 over the network 50 via the network interface 220. The telematics data 212 may be used to derive useful asset information and analytics, by the telematics server 130. Optionally, an operator 10 may tap an NFC tag to the NFC module 260 to identify themself as the operator 10 of the asset 100. Additionally, an external peripheral, such as a GPS receiver, may connect with the telematics device 200 via the short-range wireless communications module 270 or the serial communications module 280 for providing location information thereto. In some implementations, the telematics device 200 receives, via the network interface 220, commands from the telematics server 130. The received commands instruct the telematics device 200 to be configured in a particular way.

Capturing Asset Data

Figure 5:
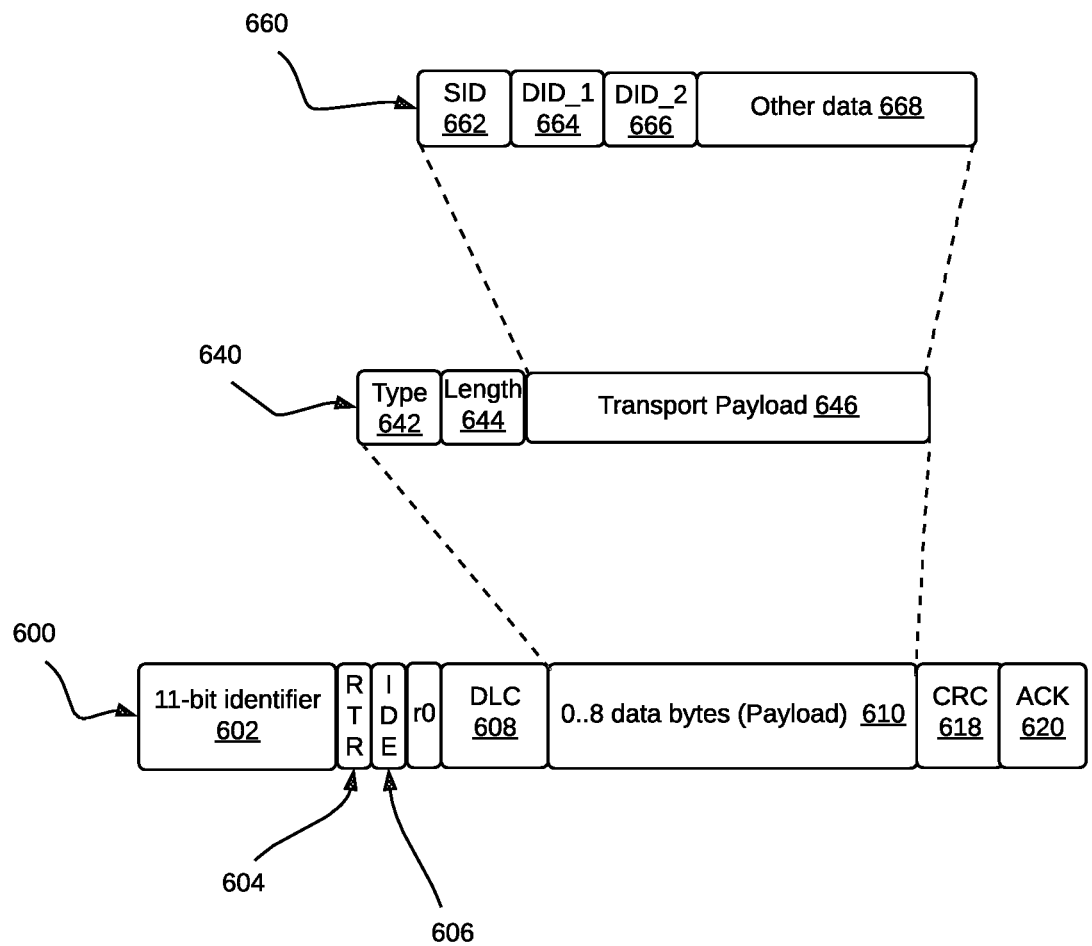
FIG. 5 is a diagram depicting a CAN frame, a transport frame within the CAN frame, and a diagnostic protocol frame within the transport frame.

A telematics device 200 may capture asset data 112 via the interface port 102 of an asset 100 via one of two main methods. The first method is for the telematics device 200 to listen for "broadcast asset data" placed by the ECUs 110 on the asset communications bus. In the case of a vehicular asset, the broadcast asset data comprises "broadcast vehicle data". The broadcast vehicle data is in a format that depends on the protocol used by the vehicle (e.g., CAN, J1939, CANOpen, etc.). For example, for a passenger vehicle using the CAN protocol, the asset communications bus is a CAN bus, such as the CAN bus 104. In this case, the broadcast vehicle data is in the form of "broadcast CAN data frames". For example, for the CAN bus 104, the ECUs 110 may place broadcast CAN data frames on the CAN bus 104 that the telematics device 200 can capture over the interface port 102, which would be an OBD port. The second method is for the telematics device 200 to actively solicit asset data via "asset data requests". For a vehicular asset, the asset data requests are "vehicle data requests". The vehicle data requests are made using one of many protocols such as OBD-II and UDS. Similarly, an ECU 110 receives a vehicle data request and, if appropriate, prepares a "vehicle data response" corresponding to the vehicle data request. For passenger vehicles that use the CAN protocol, vehicle data requests and vehicle data responses are encapsulated in CAN data frames typically in a transport protocol frame. CAN data frames carrying vehicle data requests and vehicle data responses are typically addressed to a particular entity rather than being broadcast on the CAN bus 104. FIG. 5 depicts a typical arrangement of protocols inside a CAN data frame for vehicles using the CAN protocol FIG. 5 depicts a standard CAN data frame in the form of CAN data frame 600. Encapsulated within the CAN data frame 600 is a transport frame 640, and encapsulated within the transport frame 640 is a diagnostic frame 660. The CAN data frame 600 consists of an 11-bit CAN identifier 602, a remote transmission request (RTR) bit in the form of the RTR bit 604, an identifier extension (IDE) bit in the form of the IDE bit 606, a data length code (DLC) in the form of DLC 608, a CAN data frame payload 610 of 8 data bytes, a CRC field 618, and an acknowledgement field in the form of ACK field 620.

The 11-bit identifier field stores a CAN identifier 602. The CAN protocol requires that all contending messages have a unique identifier. An ECU 110 typically has a CAN ID on which it receives vehicle data requests and another CAN ID on which it sends vehicle data responses. For example, an ECU may receive vehicle data requests on CAN ID 0x750 and then provide vehicle data responses using the CAN ID 0x758. In this case, a diagnostic tool or a telematics device prepares a CAN data frame 600 containing the CAN ID 0x750 along with the vehicle data request payload encapsulated within the CAN data frame 600. The diagnostic tool or telematics device then places the CAN data frame 600 on the CAN bus 104. Subsequently, to receive the vehicle data response, the diagnostic tool or telematics device listens on the CAN bus 104 for a CAN data frame 600 containing the CAN ID 0x758, then examines the CAN data frame payload 610 for a vehicle data response corresponding to the vehicle data request. More on the vehicle data requests and vehicle data responses will be explained below.

The RTR bit 604 denotes a remote transmission request.

The IDE bit 606 has a value of 0 when the CAN data frame 600 is a standard CAN data frame with an 11-bit identifier. The IDE bit 606 has a value of 1 when the CAN data frame is an extended CAN data frame.

The DLC 608 indicates the length of the relevant bytes in the CAN data frame payload 610. The total length of the payload is 8 bytes; however some CAN data frames may carry fewer than 8 bytes.

The CAN data frame payload 610 is 8 bytes long and may contain either raw data, or diagnostic protocol frames encapsulated in a transport frame, as will be explained below.

The CRC field 618 contains a checksum for error detection.

The ACK field 620 is set by nodes receiving an accurate CAN message.

For vehicle data requests and vehicle data responses exchanged between an ECU 110 and a diagnostic tool or a telematics device, a transport protocol is typically used to transport the requests inside a transport frame. A transport frame 640 is encapsulated within a CAN data frame 600 in the CAN data frame payload 610 thereof. A transport frame 640 is generally composed of a header and a payload. The header of the transport protocol may contain both a type 642 and a length 644. For example, in the International Standards Organization Transport Protocol (ISO-TP), the upper nibble of byte 0 contains an indication of the type of transport frame. For ISO-TP, a type value of 0 indicates that the transport frame is a single frame and the data encapsulated in the transport payload 646 is all the data being sent. The transport frame 640 is encapsulated in the CAN data frame payload 610 of the CAN data frame 600, and the first byte of the transport frame contains a type 642 and a length 644. Accordingly, the payload of the transport payload 646 may hold a maximum of 7 bytes. While this may be sufficient for many vehicle data requests, the 7 bytes may not be sufficient for some vehicle data responses that carry large amounts of data. In that case, ISO-TP provides for multi-frame transport of data. The first frame of a multi-frame message has a type of 1. Furthermore, the lower nibble of the type 642 and the length 644 contain the full size of the data being sent. In this case, the maximum size of data that can be sent by a multi-frame ISO-TP message is 4095 bytes (0x0FFF). The first frame of a multi-frame message can only carry the first 6 bytes of a multi-frame ISO-TP message. Subsequent frames of a multi-frame message have an upper nibble of 2, and a lower nibble containing a frame number between 0x0 and 0xF starting at 1 and rolling over to 0 after reaching 0xF. A flow control frame that controls whether individual frames are to be acknowledged and a time duration between subsequent frames has a type of 3. Furthermore, a flow control frame has 2 bytes specifying the flow control and duration. Another variation of the ISO-TP is the BMW-TP which includes an additional byte in byte position 0, the additional byte being the low byte of the response CAN ID that the particular ECU is to use for the response.

Specific diagnostic protocols exist for querying the ECUs 110 requesting specific data or for configuring an ECU in a particular mode. Examples of diagnostic protocols include OnBoard Diagnostic (OBD), Unified Diagnostic Services (UDS) and the keyword protocol (KWP). A diagnostic frame 660 typically has a service identifier (SID) 662 which specifies the diagnostic service requested from an ECU, along with one or more data identifier (DID), such as DID_1 (shown as field 664) and DID_2 (shown as field 666). A diagnostic frame 660 may also contain other data 668. A diagnostic request frame is typically short enough (such as 3 bytes) and may therefore be sent in the transport payload 646 of a single frame transport protocol message. Since the transport payload 646 of a single frame transport message is 7 bytes, the diagnostic request may be 7 bytes long which is generally enough to specify a service, and a number of DIDs. The diagnostic response typically contains more than 7 bytes and therefore is usually spread over a multi-frame transport message.

Some standardized higher-layer protocols define how data stored in the CAN data frame payload 610 of CAN data frames 600 are to be translated into asset data that are highly utilized in vehicle telematics (e.g., OBD2, SAE J1939, CANopen). In J1939, for example, vehicle parameters (e.g., speed, tire pressure) are encoded into the CAN data frame payload 610 of a CAN data frame 600, and are organized by Suspect Protocol Numbers (SPNs), which are expressed as labels in the CAN data frame payload 610, and are further organized by Parameter Group Numbers (PGNs), which are expressed as labels in the CAN identifier 602. As an example, as set out in J1939-71 (revised June 2006), the vehicle parameter "wheel-based vehicle speed" is labeled as SPN 84 under PGN 65265, and is expressed in the CAN data frame payload 610 of a CAN data frame 600 in 2 bytes of data (providing $2^{16}=65536$ possible combinations of 1s and 0s), with incrementation at 1/256 km/h per bit (incrementing the number by 1 means an increase in 1/256 km/h or 0.00390625 km/h), with 0 offset (i.e., "00000000" means 0 km/h). This formula for deriving a human-intelligible value for "wheel-based vehicle speed" may make up part of a "signal definition". In this disclosure, a signal definition is a set of instructions for obtaining and decoding a data message into usable information.

Challenges with Different Vehicle Types

A growing number of vehicles, including electric vehicles (EVs), do not exclusively use standardized higher-layer protocols to provide asset data. A telematics device may be configured to use proprietary protocols as well, however a proprietary protocol or even a proprietary vehicle data query on a standard protocol requires knowledge of the vehicle type. Accordingly, knowing the vehicle in which the telematics device is installed is necessary to send vehicle data queries suitable for the vehicle.

In addition, a proprietary vehicle data request that requests device status data from one ECU in a first vehicle type, may have unintended consequences when received by another ECU in a second vehicle type. As some CAN or diagnostic protocol messages are used to configure ECUs, a misinterpreted vehicle data request can cause malfunction or unintended operational behavior. Such situations are sometimes termed "engine interference" or more broadly "operation interference", as it may interfere with other components of the powertrain such as the transmission, anti-lock braking systems (ABS), and so on. In this disclosure, "operation interference" refers to unintended misconfiguration of an ECU as a result of receiving a CAN message that was intended for a different purpose and coincidentally has similar patterns such as another proprietary CAN message.

It is becoming increasingly difficult for a telematics device to determine, without express indication, what type of vehicle it is installed in, and therefore what set of messaging protocols it is to use to begin collecting information from the vehicle. In earlier times, when the majority of vehicles relied primarily on one of the common standardized higher-layer protocols, a telematics device could be installed in any vehicle, step through a fairly straightforward procedure to determine which of the common standardized protocols the system was installed in, and configure itself to follow the appropriate protocols accordingly. However, with greater and greater deviation from the common standardized protocols (including in jurisdictions in which communication protocol standardization is less prevalent), more sophisticated means of determining the type of vehicle that a telematics device is installed in are required.

Asset Platform and Vehicle Platform

In this disclosure, we define an "asset platform" as a set of assets of different types but share a few properties. Specifically, assets in an asset platform produce similar asset data in response to similar asset data queries, provide desired information in response to a set of asset data queries, and experience operational interference in response to a set of error causing asset data requests. As an example of an asset platform, we define the concept of a "vehicle platform". A vehicle platform is defined as a set of vehicles that share a few properties. Specifically, vehicles in a particular vehicle category produce similar vehicle data in response to a set of vehicle data queries, provide desired information in response to a set of vehicle data queries, and experience operational interference in response to a set of error causing vehicle data requests. A vehicle platform is not a particular auto manufacturer or a particular model. One reason for defining a vehicle platform as being distinct from a vehicle make or model is that a vehicle platform will largely be defined by the ECUs installed in the vehicle. Many ECUs may be common to vehicles of different makes. Another reason for defining a vehicle platform as being distinct from a vehicle make or model is that different auto manufacturers collaborate and make largely similar vehicles with different makes and models. For example, a "Mazda Previa" ™ and a "Ford Escape" ™ are practically the same car with different branding and cosmetic differences. Similarly, a "Pontiac Vibe" ™ and a "Toyota Matrix" ™ are also similar vehicles with different makes and models. A vehicle platform may thus contain vehicles of different makes and models that share the common properties mentioned.

Tags

In this disclosure, we define the term "asset tag" (or "tag" for short) to refer to a signature or a pattern that can assist in identifying an asset platform. For an asset, a telematics device determines an asset platform by detecting at least one tag on the interface port. An asset platform is determined by a telematics device in order to better select the appropriate protocol to use to query the asset. The telematics device also uses the asset platform for selecting optimal asset data queries to use with the asset in order to obtain asset data from the asset. Additionally, the telematics device can avoid operational interference by not using any error causing asset data requests for the determined asset platform.

For a vehicular asset, "vehicle tags" assist in identifying a vehicle platform. A telematics device determines a vehicle platform by detecting at least one tag on the interface port of the vehicle. A telematics device uses the determined vehicle platform to select the appropriate vehicle protocol to use with the vehicle, to select the optimal vehicle data queries to use to obtain vehicle data, and to avoid vehicle data requests that are considered error causing vehicle data requests for the determined vehicle platform.

Assets With Multiple Interfaces

Figure 6:
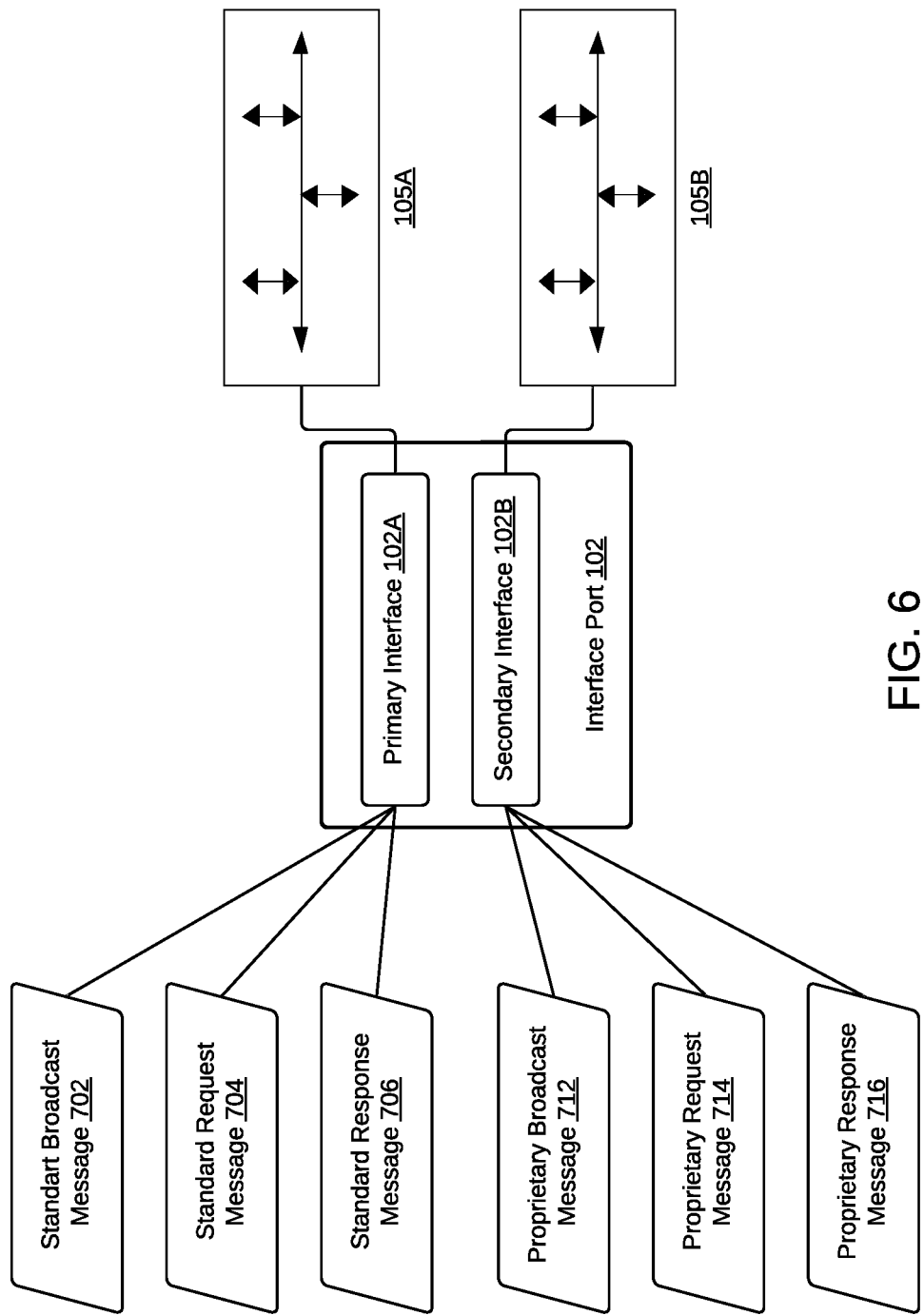
FIG. 6 is a block diagram depicting an interface port and two asset communications buses of an asset with associated messages.

Recently, some assets are built with multiple interfaces on the interface port thereof. Each interface is connected to an asset communications bus. Typically, an asset with more than one interface has two interfaces; a primary interface and a secondary interface. With reference to FIG. 6, there is a conceptual block diagram of an interface port 102 of an asset. The interface port 102 contains a primary interface 102A and a secondary interface 102B. The primary interface 102A connects to a primary asset communications bus 105A, and the secondary interface 102B connects to a secondary asset communications bus 105B. The primary interface 102A is typically used to exchange standard messages that are mandated for compliance with particular standards. Examples of standard messages include standard broadcast messages 702, standard request messages 704, and standard response messages 706. The secondary interface 102B is typically used to exchange proprietary messages including proprietary broadcast messages 712, proprietary request messages 714, and proprietary response messages 716. In some cases, however, standard messages may be sent over the secondary interface 102B and proprietary messages may be sent over the primary interface 102A.

Figure 9:
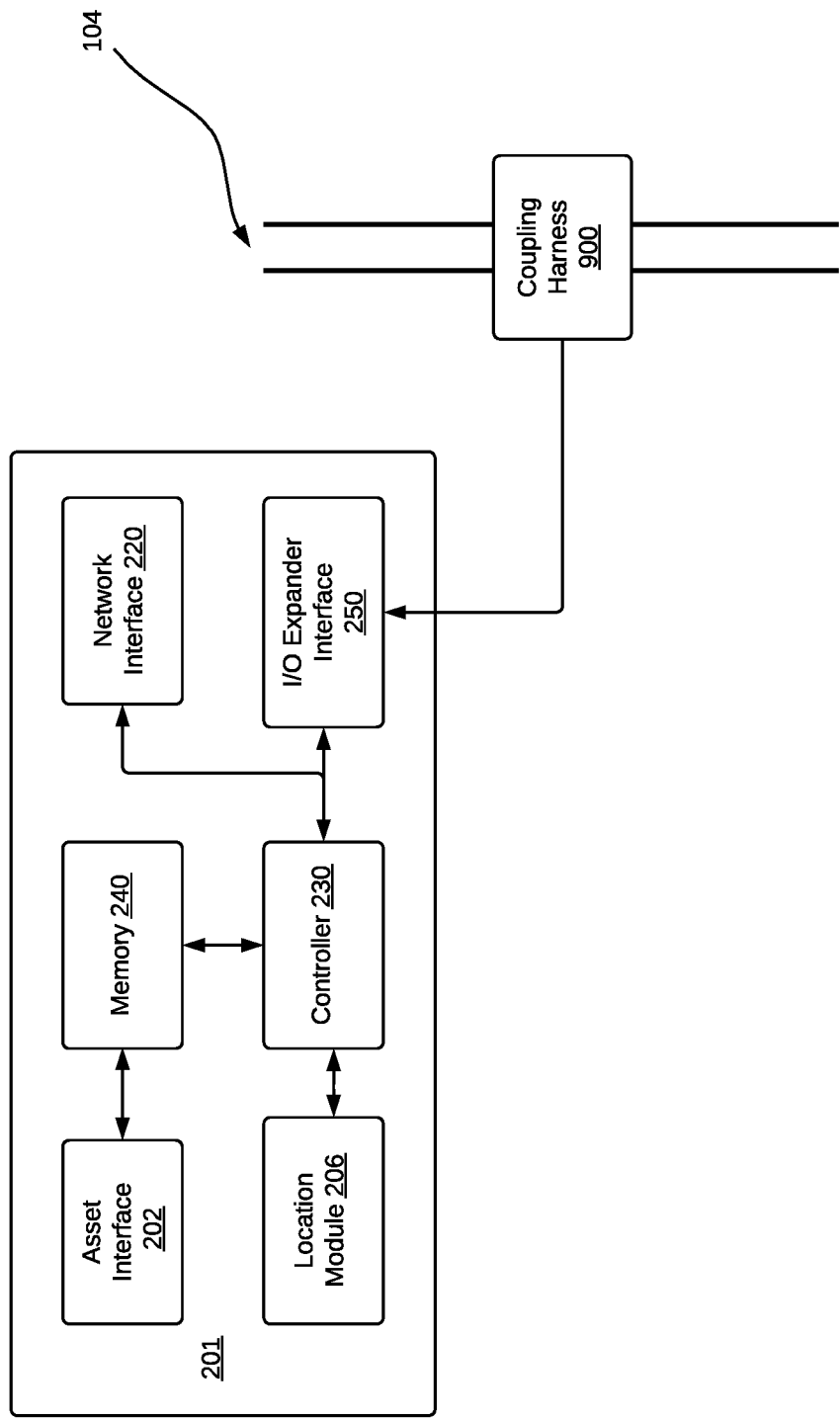
FIG. 9 is a block diagram depicting a coupling harness connected to a telematics device via an I/O expander interface.

For a vehicle asset, vehicle manufacturers have started using multiple CAN buses on the vehicles for exchanging different types of messages. For most vehicles the interface port 102 is in the form of an OBD-II port 300. Some vehicles now use two CAN buses in which a primary CAN bus serves as the primary asset communications bus 105A and a secondary CAN bus serves as the secondary asset communications bus 105B. The primary CAN bus is accessible via a primary CAN interface and a secondary CAN bus is accessible via a secondary CAN interface. The primary CAN interface and the secondary CAN interface are interface pins on the OBD-II port J1962 connector of the vehicle. FIG. 9 shows the OBD-II J1962 connector of FIG. 3, but with additional signals designated for use by a secondary CAN bus. It has been observed that the primary CAN bus is often accessible via the interface pins 6 and 14. Thus the primary interface comprises the first CAN interface (CAN1) which uses pins 6 (CAN1H) and 14 (CAN1L). Different vehicle types use different pins for the secondary CAN interface. A second CAN interface, referred to as CAN2, uses pins 2 (CAN2H) and 10 (CAN2L). A third CAN interface, referred to as CAN3, uses pins 3 (CAN3H) and 11 (CAN3L). A single-wire CAN interface, referred to as SWC, uses pin 1. Since SWC uses digital logic voltage, the signal on the SWC is relative to ground. In other words, SWC uses pins 1 and 5 (signal ground). The most commonly used CAN interface is CAN1, which uses interface pins 6 and 14. As such, a vehicle that uses two CAN buses typically routes the primary CAN bus to interface pins 6 and 14 (CAN1), and routes a secondary CAN bus on any one of CAN2, CAN3, or SWC.

The primary CAN interface is typically used for mandatory and standard protocol messages. For example, OBD and UDS messages as well as standard broadcast CAN messages are often sent on the primary CAN bus, which is routed to the primary CAN interface (CAN1) that uses interface pins 6 and 14. The secondary CAN interface is typically used for proprietary messages that are specific to a particular vehicle platform. While this is generally the case, some vehicles may contain ECUs that exchange proprietary messages on the primary CAN interface. Similarly, some vehicles may contain ECUs that exchange standard protocol messages on the secondary CAN interface. Typically a vehicle will not use multiple secondary CAN interfaces; i.e., there is usually one primary CAN interface and one secondary CAN interface.

Assets With Restricted Access Interfaces

Some assets may have an asset communications bus, a gateway, and an interface port. In such assets, the gateway is positioned between the asset communications bus and the interface port. The gateway has one or more rules that block certain data from passing from the asset communications bus to the interface port. For example, the gateway may block broadcast traffic by one or more ECUs from reaching the interface port. Conversely or additionally, the gateway may prevent request messages from reaching the asset communications bus.

Figure 8:
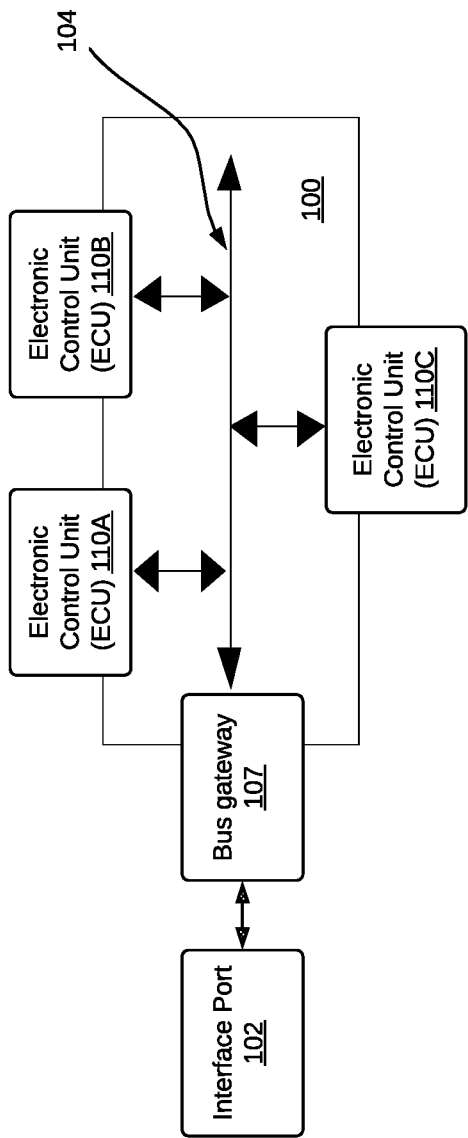
FIG. 8 is a block diagram showing an asset communications bus, connected to an interface port via a bus gateway

For example, in the case of a vehicular asset having a bus gateway, reference is made to FIG. 8. With reference to FIG. 8, the gateway 107 is an electronic device that connects the CAN bus 104 to the interface port 102. The gateway 107 is configured to pass only some types of data from the CAN bus 104 to the interface port 102. For example, in some implementations the gateway 107 blocks broadcast CAN data frames from passing from the CAN bus 104 to the interface port 102. Accordingly, a telematics device connected to the interface port 102 cannot capture any broadcast vehicle data, such as broadcast CAN data frames. In some implementations, the gateway 107 blocks some or all vehicle data requests, such as requests made using the OBD and/or UDS protocols, and prevents them from reaching the CAN bus 104.

Coupling Harness

For vehicular assets, coupling harnesses have been developed to capture vehicle data using capacitive coupling with one or more of the signal lines in the vehicle. A coupling harness contains a capacitive clamp that clamps onto signal lines in the vehicle. In some implementations, a coupling harness is configured to clamp onto the CAN bus signal lines (wires) corresponding to the CANH and CANL signals. When signals pass through the CAN bus signal lines, the capacitive clamp captures the signal through capacitive coupling. For example, with reference to FIG. 9, there is shown a simplified depiction of a coupling harness 900 that captures asset data in the form of coupled CAN signals from the CAN bus 104 (or other signal lines containing asset data) and sends the coupled CAN signals to the telematics device 201 via the I/O expander interface 250. In the example of FIG. 9, the I/O expander interface 250 is a CAN transceiver.

Figure 10:
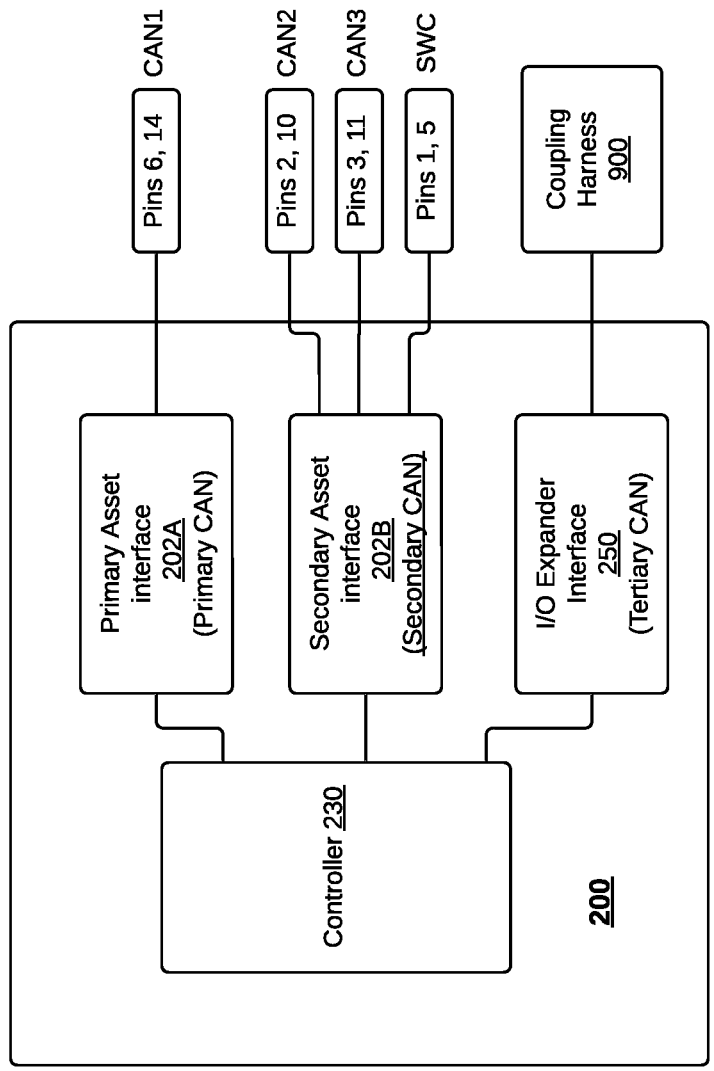
FIG. 10 is a block diagram of a telematics device having a primary asset interface, a secondary asset interface, and a tertiary asset interface.

In addition to a primary CAN interface and a secondary CAN interface, a coupling harness can serve as a tertiary asset communications bus and a tertiary asset interface. Alternatively, a vehicle that only uses a primary CAN interface (CAN1, interface pins 6 and 14) can provide proprietary messages or information on the tertiary CAN interface provided by a coupling harness 900. FIG. 10 is a simplified block diagram depicting a telematics device 200 having a primary asset interface 202A, a secondary asset interface 202B, and a tertiary asset interface in the form of the I/O expander interface 250 and coupling harness 900. In FIG. 10, the primary asset interface 202A is in the form of a primary CAN interface that uses interface pins 6 and 14

Figure 7:
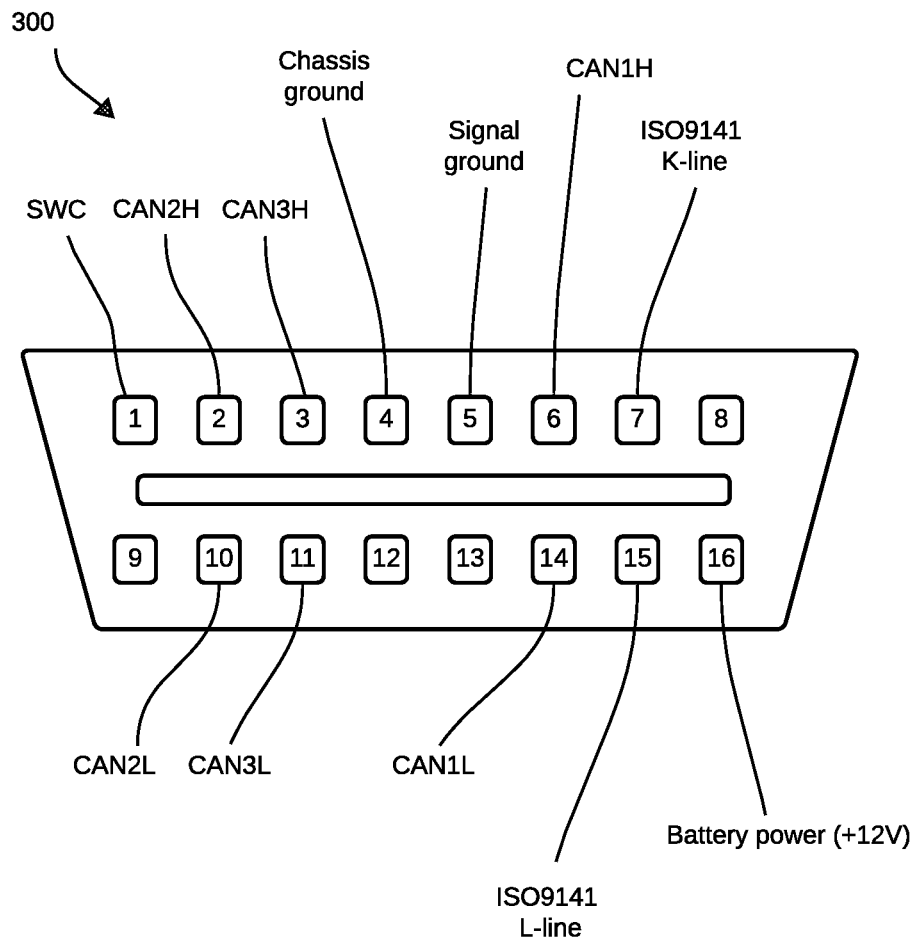
FIG. 7 depicts the OBD-II port connector of FIG. 3 showing additional CAN interfaces on some of the pins thereof.

(CAN1 in FIG. 7). The secondary asset interface 202B is connected to CAN2 (pins 2, 10), CAN3 (pins 3, 11), and SWC (pins 1, 5) in a multiplexed arrangement. As will be described below the telematics device 200 needs to determine which of the interfaces CAN2, CAN3, and SWC is being used by the vehicle as the secondary asset interface. The telematics device 200 goes through a process where the different possible interfaces are checked to determine the primary interface and the secondary interface used by the asset.

Identifying an Asset Platform for an Asset Having Multiple Interfaces

Figure 11:
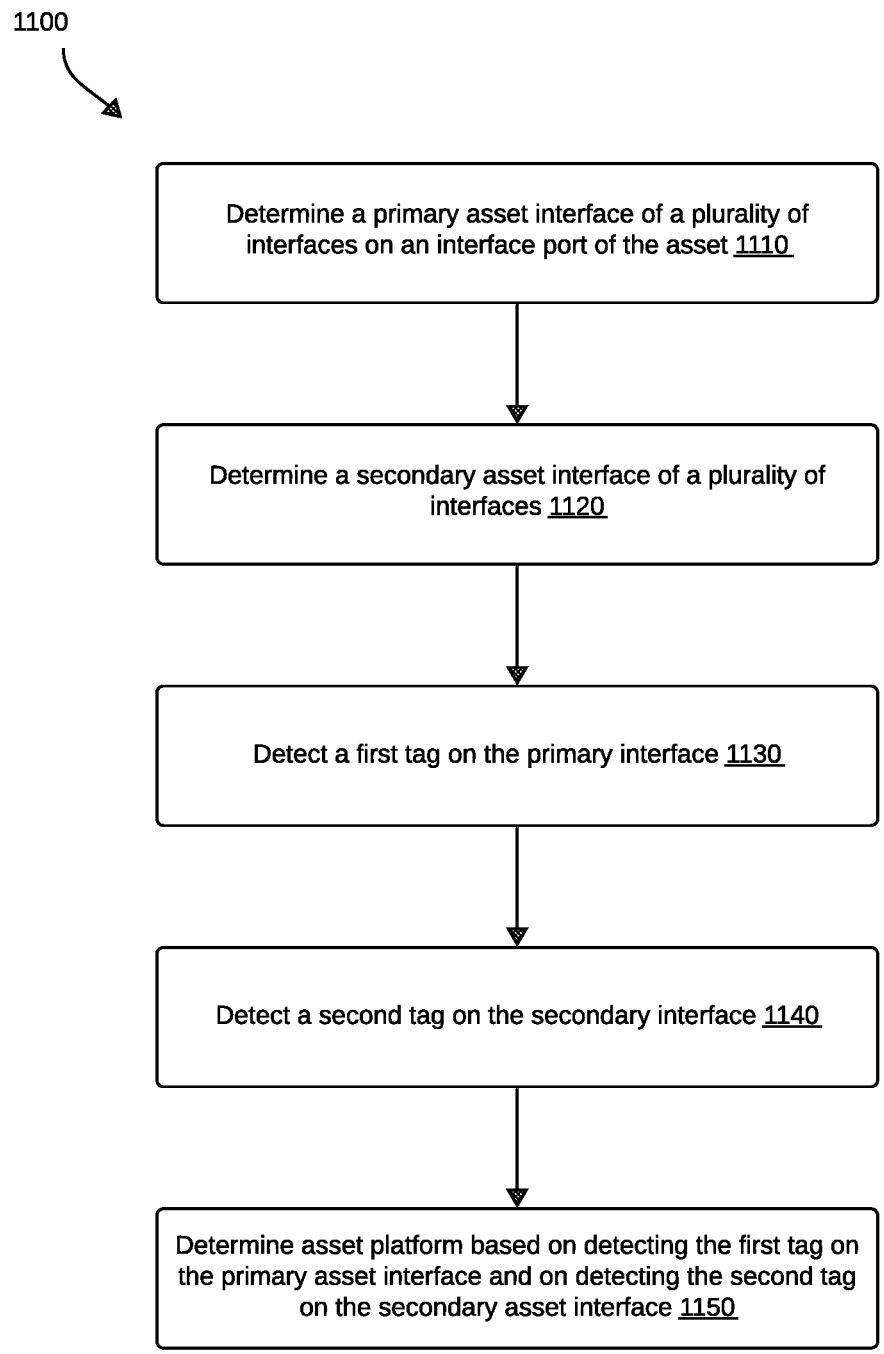
FIG. 11 is a flowchart depicting a method by a telematics device for determining an asset platform.

In one aspect of the present disclosure, and with reference to FIG. 11, there is provided a method 1100 by a telematics device. The method 1100 is for identifying an asset platform. The method begins at step 1110 in which the telematics device 200 determines the primary interface of a plurality of interfaces of an asset 100 to which the telematics device 200 is coupled. Determining the primary interface comprises detecting an asset activation event on a first interface of the plurality of interfaces. For example, with reference to FIG. 7 and FIG. 9, a telematics device 200 coupled to a vehicular asset determines that the CAN interface CAN1 (i.e., the interface pins 6 and 14) is the primary interface when the telematics device detects a vehicle on event on interface pins 6 and 14. For a vehicle with an internal combustion engine (ICE), the vehicle on event is an ignition event. Detecting an ignition event may include detecting a revolutions-per-minute (RPM) that is greater than a particular threshold value. For example, a vehicle having an ICE, detecting an ignition event may begin with sensing motion by an IMU 290, the motion indicative of a person entering the vehicle. Sensing the motion may be followed by checking the battery voltage for a cranking event in which the battery voltage drops significantly then rises to a charging level. Subsequent to detecting the cranking event, the telematics device 200 checks the various interface pins for data using varying protocols and varying baud rates. For example, the telematics device 200 may try different protocols such as CAN, J1939, or CANOpen. Detecting an ignition event may include requesting the RPM on each set of interface pins in the interface port using different protocol and baud rate combinations. Upon receiving an RPM value that is greater than a particular threshold on a particular interface signal line, the telematics device designates such an interface as the primary asset interface. For example, if a vehicle responds with an RPM on the first CAN interface (CAN1, interface pins 6 and 14), then the telematics device designates CAN1 as the primary asset interface for that vehicle. For an EV, the asset activation event is an EV ON signal indicating that the EV is on. Most EVs report such signals on interface pins 6 and 14, while some may report the EV ON signal on pins 3 and 11.

At step 1120, the telematics device 200 determines the secondary asset interface of the asset. Determining the secondary asset interface comprises checking all interface pins except the ones designated as the pins for the primary asset interface. For each of the plurality of asset interfaces other than the primary asset interface, the telematics device checks for intelligible asset data. The telematics device checks for intelligible asset data by listening on each interface using a particular protocol and a particular baud rate combination. In some implementations, the telematics device 200 stores a table of communications protocols and associated supported baud rates. The telematics device 200 cycles through such a table and listens on each asset interface of the plurality of asset interfaces except the primary asset interface. The telematics device 200 decodes any asset data obtained by listening and checks whether it contains intelligible asset data. Intelligible asset data denotes asset data that contains expected information and values typically used by either standard or proprietary protocols. For example, intelligible asset data may contain CAN data frames, transport frames, diagnostic protocol frames, or proprietary data frames recognized by the telematics device to be carrying information that can be decoded. Detecting intelligible asset data on an asset interface confirms that the asset interface uses the used communications protocol at the used baud rate. Detecting the intelligible asset data on the asset interface also confirms that the asset uses such an asset interface as a secondary asset interface. Thus far the telematics device 200 only listens for data in an attempt to identify the secondary asset interface. It is, however, possible that the secondary asset interface does not contain much broadcast asset data and therefore listening only does not enable the telematics device 200 to identify the secondary asset interface. When no intelligible asset data is detected in response to listening for intelligible asset data, the telematics device 200 uses a more proactive method to identify the secondary asset interface. Specifically, the telematics device sends requests on the plurality of interfaces of the asset, except the primary asset interfaces. For each of the plurality of asset interfaces, except the primary asset interface, the telematics device uses different asset communication protocol and baud rate combinations to send at least one request for asset data on the current interface of the plurality of interfaces excluding the primary asset interface. The telematics device 200 cycles through the interfaces selecting one interface at a time and sending a request thereon using an asset communication protocol and baud rate combination. In this disclosure, a "current interface" is the currently selected interface on which the telematics device 200 is sending an asset data request. In response to receiving at least one response to the at least one request, the telematics device designates the current interface of the plurality of interfaces excluding the primary asset interface as the secondary asset interface.

In step 1130, the telematics device detects a first tag on the primary interface. Detecting a tag means receiving asset data containing a signature of a pattern of the first tag. For example, on the primary interface of a vehicle using the CAN protocol, receiving a CAN data frame with a particular value in the CAN identifier 602 may comprise detecting a first tag. As another example, the telematics device 200 may send a vehicle data request using one of the standard protocols such as OBD or UDS, and then receive a vehicle data response corresponding to vehicle data request. Receiving that vehicle data response may comprise detecting a first tag. In other implementations, receiving the vehicle data response with a particular value at a particular location within the response frame may comprise detecting a first tag. In some implementations, a missing broadcast asset data for a predetermined duration may comprise detecting a first tag. For example, certain vehicles may not broadcast certain data while others do. In this case, the absence of the data may comprise detecting a first tag. As discussed, most tags checked on the primary interface correspond to standard protocol frames, such as broadcast CAN frames, OBD requests and responses, and UDS requests and responses. In most implementations, the tag checked at the primary interface is a standard tag. A standard tag is a pattern or a signature found in a standard protocol frame. A standard tag may be broadcast, i.e. is part of a broadcast frame, such as a broadcast CAN data frame. Alternatively, a standard tag may be sent in an asset data response, such as a response to an OBD or UDS request.

At step 1140, the telematics device detects a second tag on the secondary asset interface. As discussed, the secondary asset interface is primarily used for proprietary messaging specific to a particular asset platform. Detecting the second tag on the secondary interface may comprise detecting a proprietary tag broadcast on the secondary asset interface. The proprietary tag is a signature of a pattern present in a proprietary frame that is broadcast on the secondary asset interface. Detecting the at least one tag on the secondary asset interface may also comprise detecting a proprietary tag in response to sending a proprietary request on the secondary asset interface. In this case, the telematics device sends an asset data request using a proprietary protocol and checks the asset data response (if any) for a specific signature or pattern. If the signature or pattern are present in the asset data response, then the telematics device has detected the proprietary tag. Detecting the second tag on the secondary asset interface may also comprise detecting the absence of a proprietary broadcast tag for a predetermined duration. To distinguish between different asset platforms, listening for proprietary broadcast tags may provide an insight into the asset platform or at least eliminate some possible asset platforms. For example, the absence of a proprietary broadcast tag that is periodically sent may allow the elimination of some asset platforms and hence assist in identifying the asset platform of the asset.

Figure 12:
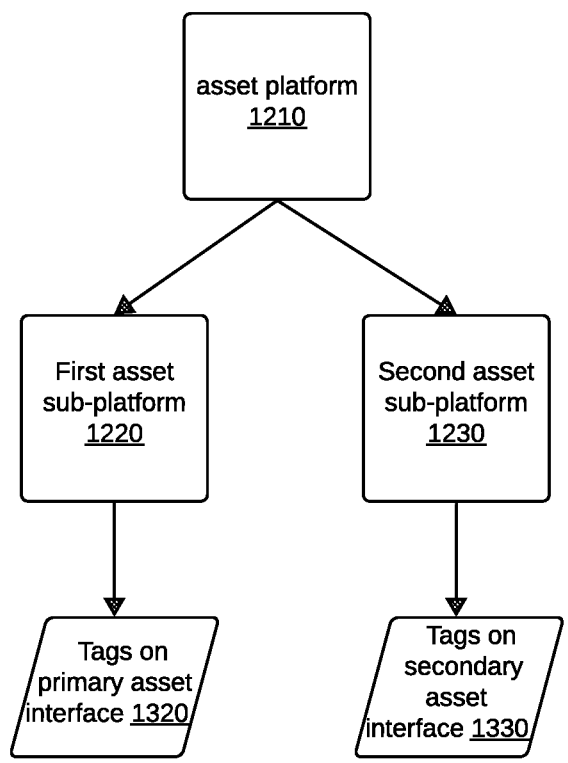
FIG. 12 is a block diagram depicting the relationship between an asset platform and asset sub-platforms.

At step 1150, the telematics device determines the asset platform based on detecting the first tag detected on the primary asset interface and on detecting the second tag detected on the secondary asset interface. With reference to FIG. 12, in some implementations, the tags detected on the primary asset interface 1320 are used to determine a first asset sub-platform 1220 and the tags detected on the secondary asset interface 1330 are used to determine a second asset sub-platform 1230. The telematics device 200 determines the asset platform 1210 from the first asset sub-platform 1220 and the second asset sub-platform 1230. For example, the first asset sub-platform may contain a first set of asset types and the second asset sub-platform may contain a second set of asset types. The telematics device may derive the asset platform 1210 by doing a set intersection operation of the first set of asset types and the second set of asset types. The result is a set of asset types representing the asset platform 1210. In another implementation, the asset platform 1210 is the union of the first set of asset types and the second set of asset types.

In some implementations, the asset provides a primary asset interface, a secondary asset interface, and a tertiary asset interface. In this implementation, the method 1100 further comprises the added step of determining a tertiary asset interface. For a vehicular asset, determining the tertiary asset interface involves reading broadcast asset data off the coupling harness 900 and checking for broadcast tags. In this case, a third asset sub-platform is determined based on the broadcast tag on the tertiary asset interface.

Advantageously, the asset platform of an asset is determined thus optimally obtaining asset data therefrom and averting operational interference.

Embodiments have been described where the techniques are implemented in circuitry and/or computer-executable instructions. It should be appreciated that some embodiments may be in the form of a method or process, of which at least one example has been provided. The acts performed as part of the method or process may be ordered in any suitable way. Accordingly, embodiments may be constructed in which acts are performed in an order different than illustrated, which may include performing some acts simultaneously, even though shown as sequential acts in illustrative embodiments. Various aspects of the embodiments described above may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

The invention claimed is:

1. A method executed by a telematics device, comprising:
    determining a primary asset interface of a plurality of interfaces on an interface port of an asset to which the telematics device is coupled, the primary asset interface associated with a first set of interface pins on the interface port;
    determining a secondary asset interface of the plurality of interfaces, the secondary asset interface associated with a second set of interface pins on the interface port;
    detecting a first tag on the primary asset interface;
    detecting a second tag on the secondary asset interface;
    determining an asset platform for the asset based on detecting the first tag on the primary asset interface and on detecting the second tag on the secondary asset interface;
    selecting at least one asset data query for obtaining asset data, based on the determined asset platform; and
    making the at least one asset data query by listening for broadcast asset data or by sending an asset data request to the asset over the interface port and processing a corresponding received asset data response.

2. The method of claim 1, wherein determining the primary asset interface comprises detecting an asset activation event on a first interface of the plurality of interfaces.

3. The method of claim 2, wherein detecting the asset activation event comprises:
    for each interface of the plurality of interfaces:
        for each combination of an asset communication protocol of a plurality of asset communication protocols and a baud rate of a plurality of baud rates:
            attempting to detect the asset activation event.

4. The method of claim 1, wherein determining the secondary asset interface comprises:
    for each interface of the plurality of interfaces excluding the primary asset interface:
        for each combination of an asset communication protocol of a plurality of asset communication protocols and a baud rate of a plurality of baud rates:
            listening for intelligible asset data; and
            when intelligible asset data is detected on a current interface of the plurality of interfaces, designating the current interface of the plurality of interfaces as the secondary asset interface.

5. The method of claim 4, wherein determining the secondary asset interface further comprises:
    when no intelligible asset data is detected in response to listening for intelligible asset data:
        for each interface of the plurality of interfaces excluding the primary asset interface:
            for each combination of an asset communication protocol of a plurality of asset communication protocols and a baud rate of a plurality of baud rates:

sending a request for asset data on a current interface of the plurality of interfaces excluding the primary asset interface; and in response to receiving a response for the request, designating the current interface of the plurality of interfaces excluding the primary asset interface as the secondary asset interface.

6. The method of claim 1, wherein detecting the first tag on the primary asset interface comprises one of:

detecting a first standard tag, which is broadcast on the primary asset interface;

detecting a second standard tag in response to sending a standard request on the primary asset interface; and detecting an absence of a third standard tag for a predetermined duration on the primary asset interface.

7. The method of claim 1, wherein detecting the second tag on the secondary asset interface comprises one of:

detecting a first proprietary broadcast tag on the secondary asset interface;

detecting a second proprietary tag in response to sending a proprietary request on the secondary asset interface; and detecting an absence of a third proprietary broadcast tag for a predetermined duration on the secondary asset interface.

8. The method of claim 1, wherein determining the asset platform comprises:

determining a first asset sub-platform based on detecting the first tag on the primary asset interface;

determining a second asset sub-platform based on detecting the second tag on the secondary asset interface; and determining the asset platform from the first asset sub-platform and the second asset sub-platform.

9. The method of claim 1, further comprising determining a tertiary asset interface of the plurality of interfaces, wherein determining the asset platform comprises:

determining a first asset sub-platform based on detecting the first tag on the primary asset interface;

determining a second asset sub-platform based on detecting the second tag on the secondary asset interface;

determining a third asset sub-platform based on detecting a third tag on the tertiary asset interface; and determining the asset platform from the first asset sub-platform, the second asset sub-platform, and the third asset sub-platform.

10. The method of claim 9, wherein the tertiary asset interface comprises a coupling harness that captures asset data by capacitive coupling.

11. A telematics device for connecting with an asset, comprising:

a controller;

an asset interface coupled to the controller, the asset interface for connecting the telematics device with an asset communications bus of the asset;

a network interface coupled to the controller;

a memory coupled to the controller, the memory storing machine-executable programming instructions which when executed by the controller configure the telematics device to:

determine a primary asset interface of a plurality of interfaces on an interface port of the asset, the primary asset interface associated with a first set of interface pins on the interface port;

determine a secondary asset interface of the plurality of interfaces, the secondary asset interface associated with a second set of interface pins on the interface port;

detect a first tag on the primary asset interface;

detect a second tag on the secondary asset interface; and determine an asset platform for the asset based on detecting the first tag on the primary asset interface and on detecting the second tag on the secondary asset interface;

select at least one asset data query for obtaining asset data, based on the determined asset platform; and make the at least one asset query by listening for broadcast asset data or by sending an asset data request to the asset over the interface port and processing a corresponding received asset data response.

12. The telematics device of claim 11, wherein the machine-executable programming instructions which configure the telematics device to determine the primary asset interface comprise machine-executable programming instructions which configure the telematics device to detect an asset activation event on a first interface of the plurality of interfaces.

13. The telematics device of claim 12, wherein the machine-executable programming instructions which configure the telematics device to detect an asset activation event on a first interface of the plurality of interfaces comprise machine-executable programming instructions which configure the telematics device to:

for each interface of the plurality of interfaces:

for each combination of an asset communication protocol of a plurality of asset communication protocols and a baud rate of a plurality of baud rates:

attempt to detect the asset activation event.

14. The telematics device of claim 11, wherein the machine-executable programming instructions which configure the telematics device to determine the secondary asset interface comprise machine-executable programming instructions which configure the telematics device to:

for each interface of the plurality of interfaces excluding the primary asset interface:

for each combination of an asset communication protocol of a plurality of asset communication protocols and a baud rate of a plurality of baud rates:

listen for intelligible asset data; and when intelligible asset data is detected on a current interface of the plurality of interfaces, designating the current interface of the plurality of interfaces as the secondary asset interface.

15. The telematics device of claim 14, wherein the machine-executable programming instructions which configure the telematics device to determine the secondary asset interface further comprise machine-executable programming instructions which configure the telematics device to:

when no intelligible asset data is detected in response to listening for intelligible asset data:

for each interface of the plurality of interfaces excluding the primary asset interface:

for each combination of an asset communication protocol of a plurality of asset communication protocols and a baud rate of a plurality of baud rates:

send a request for asset data on a current interface of the plurality of interfaces excluding the primary asset interface; and in response to receiving a response for the request, designate the current interface of the plurality of interfaces excluding the primary asset interface as the secondary asset interface.

16. The telematics device of claim 11, wherein the machine-executable programming instructions which configure the telematics device to detect the first tag on the primary asset interface comprise one of:
- machine-executable programming instructions which configure the telematics device to detect a first standard tag which is broadcast on the primary asset interface;
- machine-executable programming instructions which configure the telematics device to detect a second standard tag in response to sending a standard request on the primary asset interface; and
- machine-executable programming instructions which configure the telematics device to detect an absence of a third standard tag for a predetermined duration on the primary asset interface.

17. The telematics device of claim 11, wherein the machine-executable programming instructions which configure the telematics device to detect the second tag on the secondary asset interface comprise one of:
- machine-executable programming instructions which configure the telematics device to detect a first proprietary broadcast tag on the secondary asset interface;
- machine-executable programming instructions which configure the telematics device to detect a second proprietary tag in response to sending a proprietary request on the secondary asset interface; and
- machine-executable programming instructions which configure the telematics device to detect an absence of a third proprietary broadcast tag for a predetermined duration on the secondary asset interface.

18. The telematics device of claim 11, wherein the machine-executable programming instructions which configure the telematics device to determine the asset platform comprise machine-executable programming instructions which configure the telematics device to:
- determine a first asset sub-platform based on detecting the first tag on the primary asset interface;
- determine a second asset sub-platform based on detecting the second tag on the secondary asset interface; and
- determine the asset platform from the first asset sub-platform and the second asset sub-platform.

19. The telematics device of claim 11, wherein the machine-executable programming instructions further comprise machine-executable programming instructions which configure the telematics device to determine a tertiary asset interface of the plurality of interfaces, and wherein the machine-executable programming instructions which configure the telematics device to determine the asset platform comprise:
- machine-executable programming instructions which configure the telematics device to detect a first asset sub-platform based on detecting the first tag on the primary asset interface;
- machine-executable programming instructions which configure the telematics device to detect a second asset sub-platform based on detecting the second tag on the secondary asset interface;
- machine-executable programming instructions which configure the telematics device to detect a third asset sub-platform based on detecting a third tag on the tertiary asset interface; and
- machine-executable programming instructions which configure the telematics device to determine the asset platform from the first asset sub-platform, the second asset sub-platform, and the third asset sub-platform.

20. The telematics device of claim 19, wherein the tertiary asset interface comprises a coupling harness that captures asset data by capacitive coupling.

* * * * *